(12) United States Patent
Ohtsuka et al.

(10) Patent No.: US 6,293,708 B1
(45) Date of Patent: Sep. 25, 2001

(54) OPTICAL CONNECTOR, AND USING METHOD AND TOOL THEREOF

(75) Inventors: Kenichiro Ohtsuka; Tomohiko Ueda; Toshiaki Kakii, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/515,500

(22) Filed: Feb. 29, 2000

Related U.S. Application Data

(62) Division of application No. 08/959,650, filed on Oct. 28, 1997, now Pat. No. 6,095,695.

(30) Foreign Application Priority Data

Oct. 28, 1996 (JP) .................................................. 8-284788
Apr. 16, 1997 (JP) ..................................................... 9-99376
Jun. 9, 1997 (JP) .................................................... 9-150703

(51) Int. Cl.[7] ...................................................... G02B 6/38
(52) U.S. Cl. .................. 385/72; 385/78; 385/81; 385/83; 385/62; 385/65
(58) Field of Search ................................. 385/53–55, 60, 385/72, 75, 78, 62, 81, 85, 65, 83

(56) References Cited

U.S. PATENT DOCUMENTS

| | | | |
|---|---|---|---|
| 4,662,713 | * | 5/1987 | Davies et al. ........................... 385/54 |
| 5,082,346 | * | 1/1992 | Myers ..................................... 385/54 |
| 5,134,673 | * | 7/1992 | Stephenson et al. ................... 385/54 |
| 5,337,390 | * | 8/1994 | Henson et al. .......................... 385/81 |
| 5,394,496 | * | 2/1995 | Caldwell et al. ....................... 385/70 |

* cited by examiner

Primary Examiner—Hemang Sanghavi
(74) Attorney, Agent, or Firm—Pillsbury Winthrop LLP

(57) ABSTRACT

An optical connector includes a first ferrule which holds the ends of a first optical fiber unit including at least one optical fiber, and a housing. The housing is a U-shaped member with parallel arms extending in the lengthwise direction of the first optical fiber unit. The housing surrounds one of the widthwise sides of the first ferrule from which the first optical fiber unit is derived and the lengthwise sides of the first ferrule, whereby the housing accommodates the first ferrule. The housing receives a second ferrule which holds the ends of a second optical fiber unit including at least one optical fiber through the U-shaped opening. The housing surrounds the lengthwise side of the second ferrule and a part of the side of the second ferrule from which the second optical fiber unit is derived, whereby the first and second ferrules are coupled together.

6 Claims, 23 Drawing Sheets

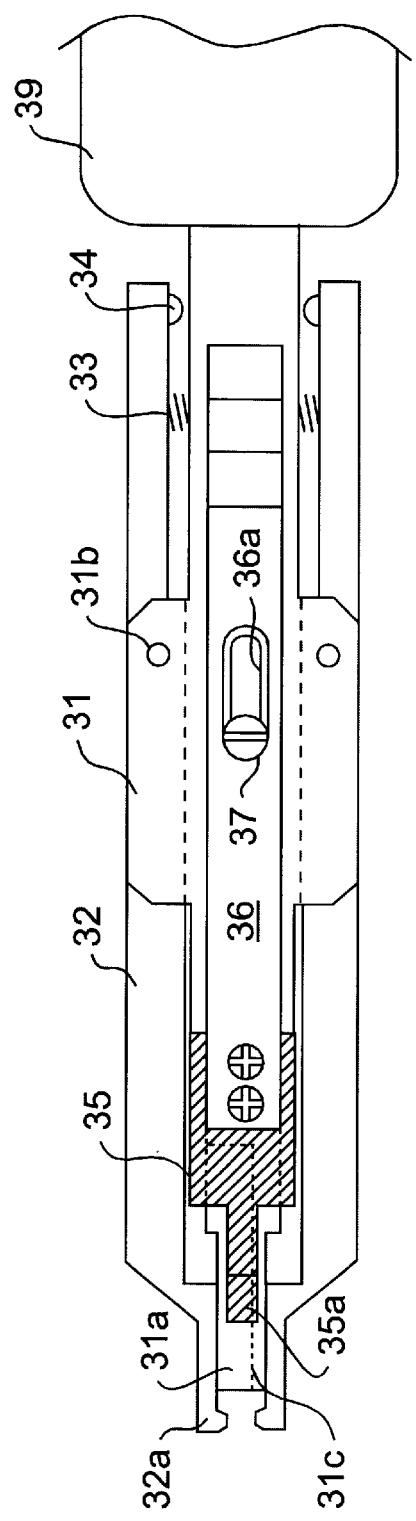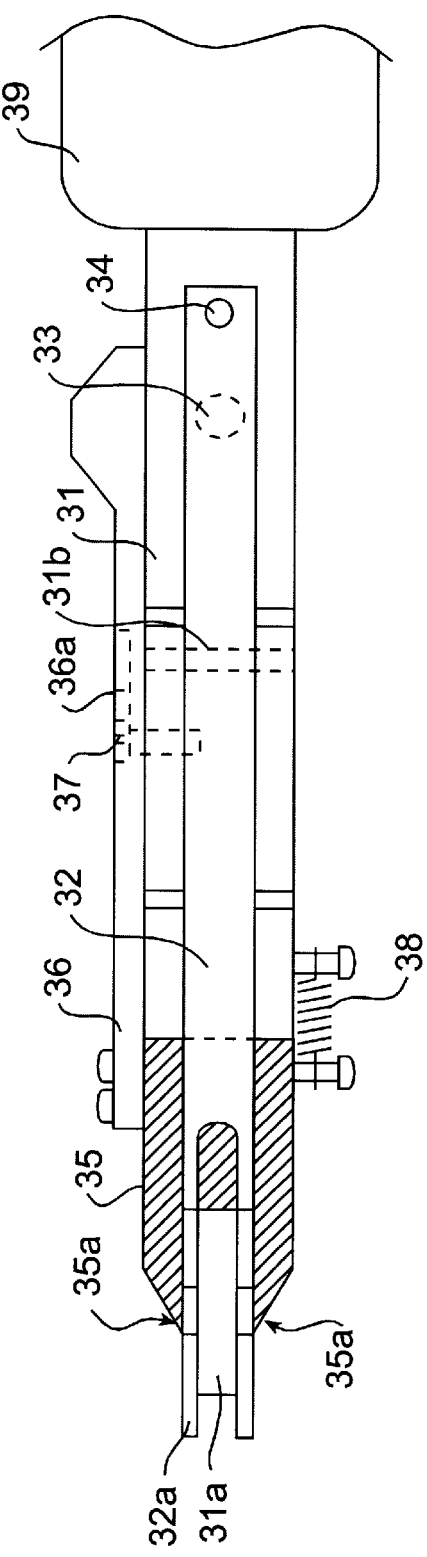

OPTICAL CONNECTOR, AND USING METHOD AND TOOL THEREOF

This is a division of Application Ser. No. 08/959,650, filed Oct. 28, 1997 now U.S. Pat. No. 6,095,695.

BACKGROUND OF THE INVENTION

1. Field of the Invention

The present invention relates to an optical connector, and a connection method and a tool for the optical connector.

2. Description of the Related Art

To detachably connect the largest possible number of optical fibers within a limited space, it is necessary to realize a high density mounting of optical fibers. An approach to realize the high density mounting is described by Konishi, et al in their paper entitled "Design and Characteristics of B-1046 High Density Fiber Termination Module (FM)", Denshi-Tushin Gakkai Sogo Zenkokutaikai Kouen Ronbunshu, 1995, P492, the gist of which will be briefly described.

The High-Density Fiber Termination Modules in a telephone exchange office are provided with optical branch modules through which the optical fiber cables connected to subscribers are optically branched to the transmission equipment and the fiber selection devices for the optical line maintenance support system. The number of optical fibers installed is increasing with the growth of the optical subscriber line network. To cope with this, it is required to increase the density of optical fiber mounting in the fiber termination modules. The optical branch modules containing optical couplers and other optical components are mounted side by side on frames in the fiber termination modules. It is, therefore, required to increase the fiber mounting density in the optical connectors as well as the mounting density of the optical branch modules in the fiber termination module.

Of the currently used optical connectors, the multi-fiber connector usually uses multi-fiber ferrules of the pin-fitting type. For an application where the ferrules, which are once coupled, will rarely be decoupled, for example, in manholes, a couple of multi-fiber ferrules are coupled together by means of simple gripping means, e.g., the clip. This type of the connector is called a MT (mechanically transferrable) connector. For an indoor application where the connectors are coupled and decouple relatively frequently, the following connector, called an MPO (multipath push on) connector, is frequently used. In the connector, a housing with a push-pull mechanism is used, are the connectors and coupled together through a connector adaptor.

In a conventional MT connector, the ends of a plural number of optical fibers are fixed to a couple of ferrules and these ferrules are coupled together, applying a refractive index matching substance. Two guide pin holes to be fit to guide pins are formed in the end face of each ferrule. The plural number of optical fibers are exposed on the end face while being located between the guide holes. The pin-hole formed end faces of the ferrules are aligned by the guide pins and abutted. The optical fibers of those ferrules, which are precisely arrayed with respect to the guide pin holes, are coupled with each other. The sides of the ferrules from which the optical fibers are led out are connected by means of a single clip. (see, Unexamined Japanese Utility Model Publication No. Hei. 2-30909)

The MT connector is advantageous in that it is simple in structure, but disadvantageous in the following. The direction for coupling the ferrules is different from the direction for clipping the ferrules. Therefore, the ferrules are coupled, and the coupled ferrules are connected by the pin. That is, two steps of connecting work are required. Thus, the connecting work is time consuming and troublesome. A connecting tool, if specially manufactured, is complicated in mechanism and structure. There is no room for mounting means additionally attached in the MT connector. As a result, it is difficult to secure a high density mounting of those connectors, or high density mounting of optical fibers, in the branch modules or the fiber termination modules.

A connector with a push-on fastening function is also used for the MT connector. An example of this is disclosed in Unexamined Japanese Patent Publication (kokai) No. Hei. 4-215608. In the disclosed connector, an MT connector and a housing containing a coiled spring are connected through an adaptor. This type of the connector is called an MPO connector. The MPO connector is advantageous in that neither of the pin connecting work nor the clipping work is required. However, it is disadvantageous in that its complicated push-on mechanism requires a large number of component parts and accordingly a large space for them, which results in difficulty in increasing the density of fiber mounting in the connector or the terminal module.

In a conventional MPO connector, ferrules are accommodated in a housing and the end faces of the optical fibers are exposed on the end faces of the ferrules. The optical fibers are bonded to the ferrules by adhesive, and then the end faces of the ferrules are polished. A couple of connectors are inserted into the connector adaptor shaped like a rectangular prism from its right and left sides, whereby the ferrules located side by side are connected to each other by two guide pins. A connector fixing mechanism is provided in the connector adaptor. An insertion guide, which is provided at the end of the housing, is engaged and fixed in the connector adaptor. The gap between the connector housing and the ferrules is a floating space.

In the MPO connector, the ferrules are connected in a PC (physical contact) where the ferrules are brought into optical contact with each other without a refractive index matching substance. The end faces of the ferrules are each slantly polished at an angle of 8° relative to a plane perpendicular to the optical axis of the optical fiber. Each optical fiber is abutted against the associated one in the order of submicron by the utilization of the hardness difference between the resin materials of the optical fibers and the ferrules.

The connecting work for the MPO connector consists of one step. Further, the connector adaptor may be attached to the frame. Because of this, this type of the connector may be used for such an application as the fiber termination module. However, the MPO connector has such shortcomings that the connector size is large and hence it is impossible to increase the connector mounting density, and that the number of necessary component parts is large and hence the cost to manufacture is large.

In many kinds of optical connectors now commercially available, optical fibers are bonded for their fixing by use of epoxy or other kinds of resins as an adhesive. When such kinds of optical connectors are connected to the optical fibers in a construction site, the connector connecting work is inefficient and such a hardening tool as a heater is indispensably used. The result is an increase of fiber cable laying cost and associated cost.

Unexamined Japanese Patent Publication (kokai) No. Hei. 8-240742 proposes a solution to this adhesive problem in the connector-fiber connecting work. In the publication, the optical fiber is positioned in the groove or channel of the optical connector, and in this state it is held and fixed therein.

FIGS. 32A to 32D are explanatory diagrams for explaining the optical connector disclosed in the publication. FIG. 16A is an exploded, perspective view showing the optical connector. FIG. 16B is a sectional view of the optical connector of FIG. 16A. FIG. 16C is a sectional view showing the optical connector when an optical fiber is fixed in the optical connector. FIG. 16D is an explanatory diagram for explaining the work of fixing the optical fiber to the optical connector. In those figures, reference numeral 201a is an exposed glass fiber portion of an optical fiber; 201b is a coated fiber portion of the optical fiber; 221 is a connector body; 221a is a guide pin hole; 221b is fiber fixing grooves or channels; 221c is a wedge insertion hole; 221d is a lateral hole; 222 is a wedge; 222a is a slanted surface of the wedge; and 223 is a spring member.

An optical fiber is inserted into the connector body 221 from the back side of the connector. The exposed fiber portion 201a of the optical fiber is positioned in one of the fiber fixing grooves 221b of a V-shape in cross section. The wedge 222 is inserted into the connector body from the wedge insertion hole 221c and moved toward the lateral hole 221d. The spring member 223 is inserted into the wedge insertion hole 221c to urge the wedge 222 forward, as shown.

The optical connector is advantageous in that there is no need for using adhesive, but has the following disadvantage. After the optical fiber is inserted into the connector body, the wedge 222 is moved forward along the exposed fiber portion 201a of the optical fiber, as shown in FIG. 16D. In some state of the contact of the wedge 222 with the exposed fiber portion 201a, there is a chance that the forward movement of the wedge 222 scrapes the exposed fiber portion 201a of the optical fiber. If the exposed fiber portion is scraped, the resultant scrape will give rise to breaking of the fiber when it is used for a long time.

SUMMARY OF THE INVENTION

It is an object of the present invention to provide an optical connector, a gripping tool, and a method for coupling and decoupling the optical connector ferrules, whereby the number of the component parts and size of the connector are reduced and coupling and decoupling work is easily made.

It is an object of the present invention to provide an optical connector, a gripping tool, and a method for coupling and decoupling the optical connector ferrules, which allows to an increase the mounting density of optical fibers in an optical fiber termination or branch module.

It is an object of the present invention to provide an optical connector with such a structure as to enable an optical fiber to be fixed therein without scraping an exposed fiber portion of the optical fiber.

BRIEF DESCRIPTION OF THE DRAWINGS

In the accompanying drawings:

FIGS. 7A to 7B are first diagrams for explaining an example of a gripping tool used for the optical connector according to the present invention;

FIGS. 31A to 31C are diagrams useful in explaining a process for working the end face of each exposed fiber of an optical fiber; and FIG. 32 are explanatory diagrams for explaining a conventional optical connector.

DETAILED DESCRIPTION OF THE INVENTION

The present invention will be described in detail referring to the preferred embodiments with the accompanying drawings as follows.

Figure 1:
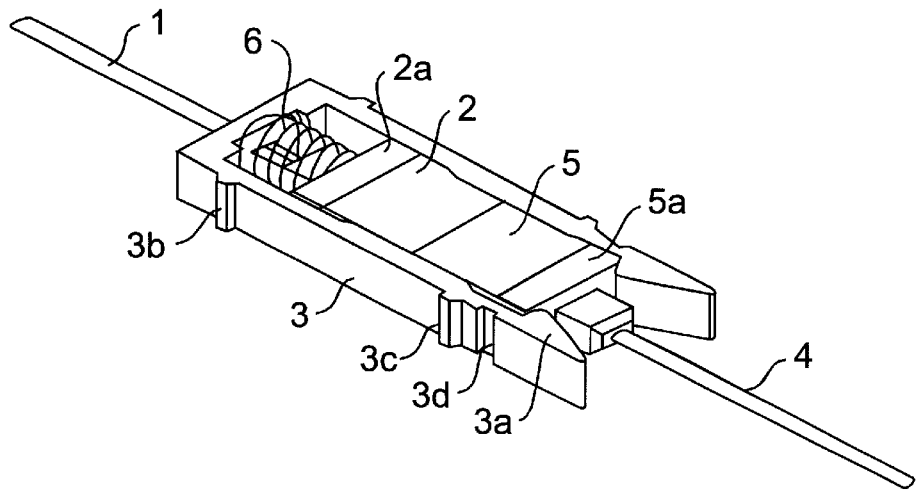
FIG. 1 is a perspective view showing a first embodiment of an optical connector constructed according to the present invention.
Figure 2A:
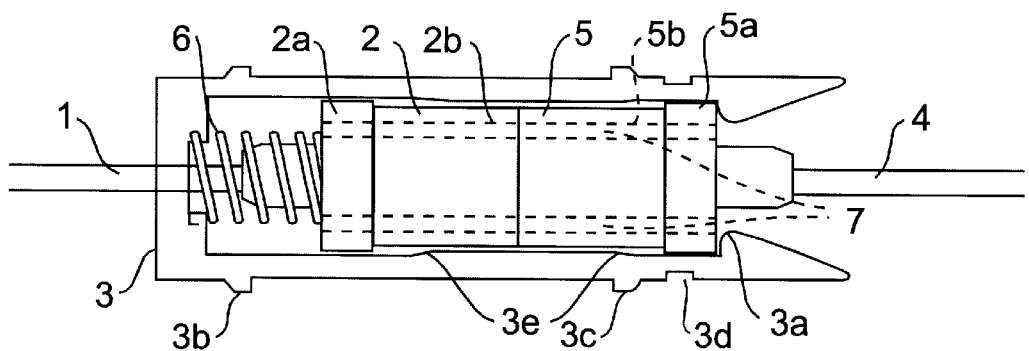
FIGS. 2A and 2B are a plan view and a front view for explaining the optical connector of the first embodiment of the invention.
Figure 2B:
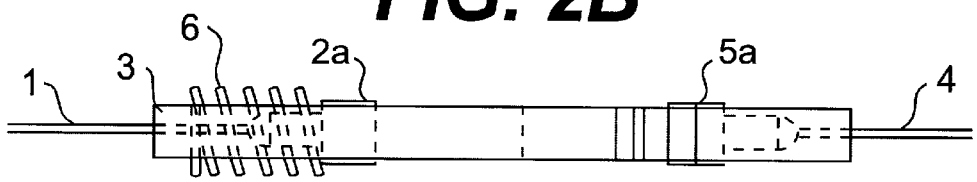

FIG. 1 is a perspective view showing a first embodiment of an optical connector constructed according to the present invention. FIGS. 2A to 2B are diagrams useful in explaining the optical connector of the first embodiment of the invention. FIG. 2A is a plan view of the optical connector, and FIG. 2B is a front view of the same. In the figure, reference numerals 1 and 4 are first and second optical fibers; 2 and 5 are first and second ferrules; 2a and 5a are collar portions of the ferrules; 3 is a housing; 3a is a holder portion of the ferrules; 3b and 3c are engaging protrusions of the housing; 3d is an engaging groove; 3e is a curved portion of the housing; 6 is a compressed coiled spring; and 7 is a guide pin.

This embodiment is an optical connector including the first ferrule 2 which holds the end of the first optical fiber 1, and the housing 3. The housing 3 is a U-shaped member with parallel arms which extend in the lengthwise direction of the first optical fiber 1 while being arrayed parallel to each other. The housing 3 surrounds the lengthwise sides (when viewed in the lengthwise direction of the housing) of the first ferrule 2 and the side (the left side in the drawing) thereof, which faces the side of the housing through which the optical fiber is led out. The housing 3 receives a second ferrule 5 which holds the end of the second optical fiber 4 through a U-shaped opening formed at the end (right end in the drawing) of the housing. The housing 3 surrounds the lengthwise side surfaces of the second ferrule 5 and a part of the side thereof, which faces the side of the housing through which the second optical fiber 4 is led out. Thus the housed two ferrules, or the first and second ferrules 2 and 5, are coupled with each other.

The ferrules 2 and 5 are indispensably used for highly precisely positioning and holding the optical fibers. The ferrules 2 and 5 are the same as the pin-fitting type ferrules used by the conventional MT connector and the MPO connector. Those ferrules are each thin and shaped like a rectangular prism, and have collar portions 2a and 5a, respectively. The ferrules, which may be used in the present embodiment, are not limited to the pin-fitting type ferrules, but may be any of other various types of ferrules. A ferrule for a single-fiber contained fiber may also be used in the embodiment, as a matter of course. The ferrules 2 and 5 are also coupled with each other by means of the guide pins 7, which are inserted into the guide pin holes 2b and 5b of those ferrules.

The coupling end faces of the ferrules 2 and 5 may be polished at right angles to their lengthwise sides as in the conventional MT connector. In this case, a low connection loss is realized. The coupling end faces of the ferrules may be polished slantly at an angle to their lengthwise sides as in the conventional MPO connector. In this case, a high reflection attenuation is secured without using a refractive index matching substance, and further the fiber core fixing work is more efficient.

The housing 3 is used for protecting and coupling the ferrules 2 and 5. The housing 3 has such a structure as to couple together the end faces of the ferrules 2 and 5 at which the tips of the optical fibers 1 and 4 are exposed, and to hold the ferrules 2 and 5 to prevent them from moving sideways. The height of the housing 3 is substantially equal to the height or thickness of the portion of each of the ferrules 2 and 5 where the collar portions 2a and 5a of the ferrules are not formed.

Within the housing 3, the coiled spring 6 is provided between the left end (when viewed in the drawing) of the housing and the side of the ferrule 2 to which the second optical fiber 4 is to be coupled. Thus the placed spring urges the first ferrule 2 toward the side (opening-formed side) of the housing 3 in which the U-shaped opening is formed, whereby the couple of ferrules 3 and 5 are stably coupled with each other. The holder portion 3a having wedge-shaped arms is provided at the right end or opening-formed side (when viewed in the drawing) the housing in which the U-shaped opening is formed. The holder portion 3a engages the corners of the end or side of the second ferrule 5 to which the second optical fiber 4 is to be coupled. In other words, the holder portion 3a detachably holds and fixes the right side of the second ferrule 5 to which the second optical fiber 4 is to be coupled, whereby retaining the coupling force and substantially excluding the influence of an external force.

The inner sides of the parallel arms of the housing 3 are on the lengthwise sides of the ferrules 2 and 5, to thereby position the portions of the ferrules except the collar portions 2a and 5a and to highly precisely align the end face of the ferrule 2 with the end face of the ferrule 5 with each other when the ferrules are coupled together. For the width of the parallel arms of the housing 3, the width between the parallel arms gradually increases in the lengthwise direction, viz., from regions near both ends of the portions of the ferrules except the collar portions 2a and 5a toward the collar portions and becomes constant just before the collar portions. The constant width continues till both the ends or the right and left ends of the housing 3. Thus, the inner sides of the parallel arms of the housing are curved outward in the regions near both the ends of the portions of the ferrules except the collar portions 2a and 5a. Those curved portions of the inner sides of the parallel arms are designated by reference numeral 3e. Since the inner sides of the parallel arms of the housing 3 are thus shaped, the ferrules 2 and 5 are slightly movable when those are coupled and decoupled.

A slit-like hole is formed in the central portion of the closed left end of the housing 3. The slit-like hole allows the first optical fiber 1 to pass therethrough. An arcuate recess is formed around the slit-like hole. The left end of the coiled spring 6 is put in the recess when the spring is set in the housing, so that the coupling force is kept constant. The ends of the coiled spring 6 are specially worked so as to form flat ring surfaces, although not illustrated in the drawing.

The engaging protrusions 3b and 3c, and the engaging grooves 3d are formed on the outer sides of the parallel arms of the housing 3 while being arranged symmetrically with respect to the center line of the housing when viewed in the lengthwise direction of the housing. The engaging protrusions 3b and 3c are used to retain the fitting of the housing 3 to an adaptor to be given later in connection with FIGS. 3 and 4. The engaging groove 3d is used for receiving protrusions of a cap to be given later in connection with FIG. 5. The cap is applied to the U-shaped opening of the housing after the ferrules 2 and 5 are coupled together; otherwise, there is a concern that the second ferrule 5 will drop out of the housing through the holder portion 3a.

The optical connector thus constructed is advantageous in that the number of necessary component parts is reduced and a high density mounting of the connectors on a frame is possible. The connectors are not provided with mounting units to mount them on the frame. If necessary, an optical connector adaptor, which has the positioning and mounting functions as described later, may be provided around the housing of the optical connectors or in the module for achieving a high density mounting of the optical connectors in an optical termination or other module.

Figure 3:
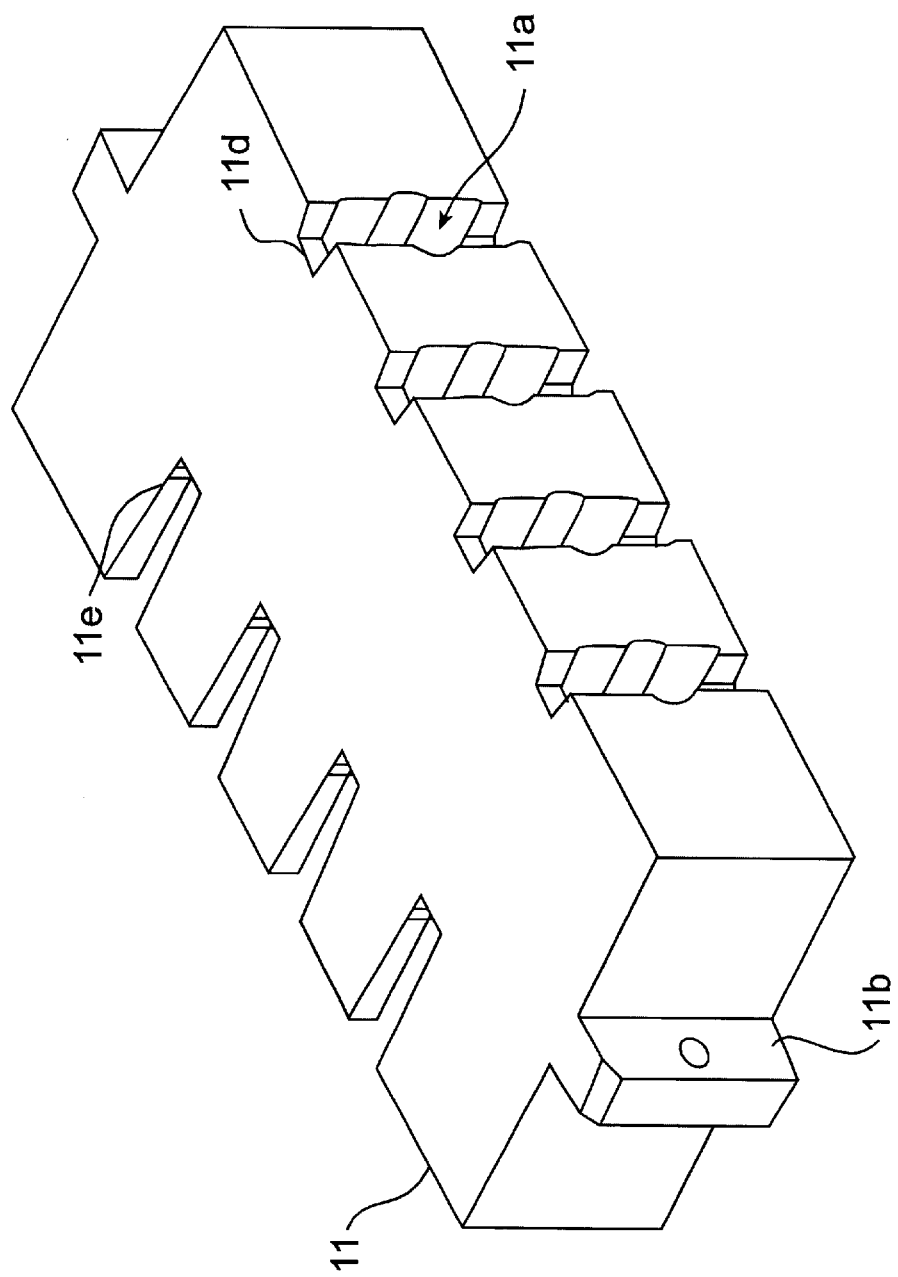
FIG. 3 is a perspective view showing an adaptor used in a second embodiment of the present invention.
Figure 4A:
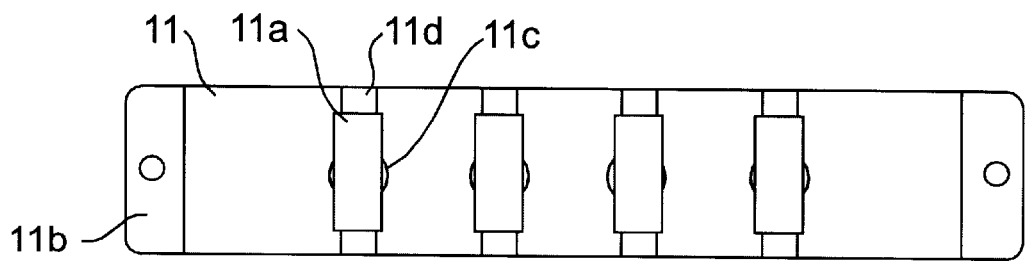
FIGS. 4A to 4C are a front view, a plan view and a rear view of the adaptor used in the second embodiment.
Figure 4B:
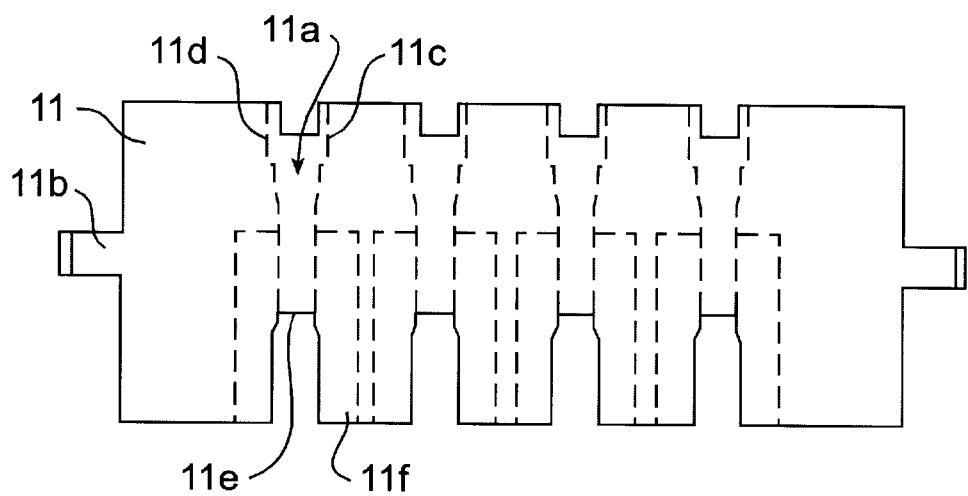
Figure 4C:
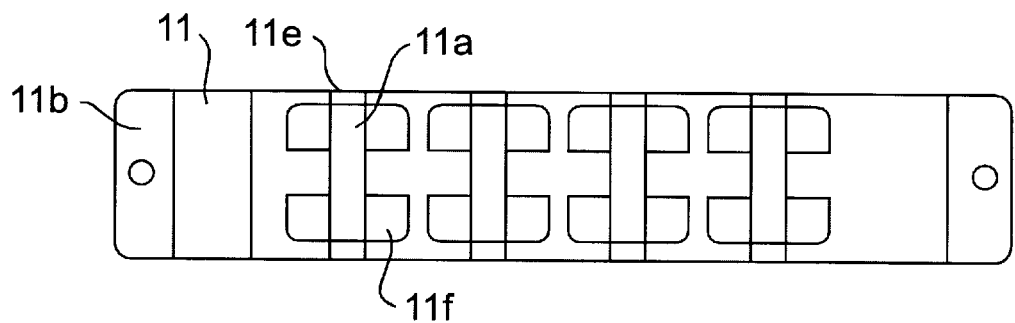

FIG. 3 is a perspective view showing an adaptor used in a second embodiment of the present invention. FIGS. 4A to 4C are diagrams showing the adaptor used in the second embodiment. FIG. 4A is a front view of the adaptor; FIG. 4B is a plan view of the same; and FIG. 4C is a rear view of the same. In these figures, reference numeral 11 is an adaptor; 11a is a through-hole of the adaptor; 11b is a collar portion; 11c is a semicircular recess; 11d and 11e are engaging grooves; and 11f is a tool positioning hole.

The housing 3 containing the ferrules 2 and 5 therein, which was described referring to FIGS. 1 and 2B, is inserted into the through-hole 11a of the adaptor 11 in a manner that the U-shaped opening-formed side of the housing 3 is first inserted. In this case, the through-hole 11a which first receives the housing 3 is a first right-hand through-hole 11a of this side of the adaptor 11, which is counted from the right end of the adaptor 11. Another housing 3 is then inserted into the second through-hole 11a. A further housing 3 is inserted into the third through-hole 11a, and so on. The adaptor 11 partially supports the parallel arms of the housing 3, and further positions the previously described optical connector and the second ferrule 5, and couples them together. The collar portions 11b are formed on the short sides of the adaptor 11. Each collar portion has a hole therein used when the adaptor is mounted on the frame.

The semicircular recess 11c for receiving the compressed coiled spring 6 is formed to a predetermined depth in one of the ends of each through-hole 11a, as shown in FIG. 4A. The engaging grooves 11d and 11e are formed in the sides (the upper and lower sides in FIG. 3) of the adaptor 11. The engaging protrusions 3b and 3c of the housing 3 (FIGS. 1 to 2B) are engaged into the engaging grooves 11d and 11e, respectively. As a result, the housing 3 is mounted into the through-hole 11a of the adaptor 11. The engaging groove 11e is shaped such that the groove 11e has a fixed width in the range from the entrance of the groove to the groove bottom where the groove 11e will tightly contact with the engaging protrusion 3c of the housing 3 when it receives the protrusion 3c, and the width of the groove 11e becomes narrow from the beginning of that groove bottom to be equal to the width of the engaging protrusion 3c and the reduced width is continued up to the end of the groove 11e. To obtain a high density mounting, a plural number of through-holes 11a are formed and the optical connectors formed with the housings and the like are plugged in those through-holes. In this example, four through-holes 11a are formed side by side, and the housings 3 including the ferrules 2 are plugged in those through-holes.

In the side of the adaptor 11 including the other ends of the through-holes 11a, four rectangular tool positioning holes 11f, respectively, are formed to a predetermined depth in the adaptor, while adjoining to the through-holes 11a, as shown in FIGS. 4B and 4C. Each tool positioning hole 11f guides a tool to be given with reference to FIGS. 7 and 8 when the second ferrule 5 is attached to and detached from the housing. The second ferrule 5 shown in FIGS. 1 and 2 is inserted from the other end of the through-hole 11a.

Figure 5A:
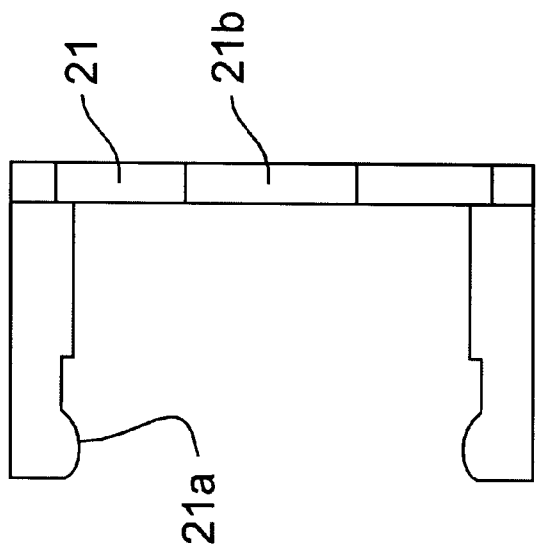
FIGS. 5A an 5B are a plan view and a right side view of a cap used the second embodiment of the present invention.
Figure 5B:
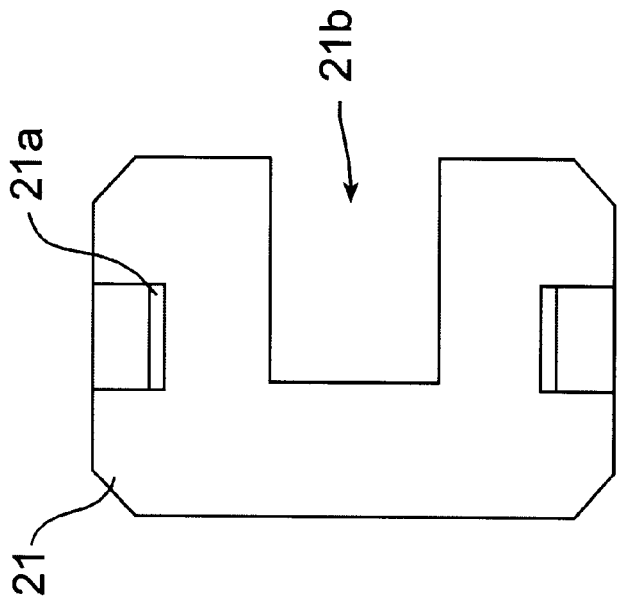

FIGS. 5A and 5B are diagrams showing a cap used in the second embodiment of the present invention, and are a plan view and a right side view of the cap. In the figures, reference numeral 21 is a cap; 21a is a protrusion of each arm of the cap; and 21b is a cutout portion. The cap 21 includes a bottom plate and two arms standing erect on the bottom plate. The protrusions 21a are formed at the distal ends of the arms. The bottom plate having the cutout portion 21b is shaped like U. After the ferrules 2 and 5 are coupled together, the cap 21 is inserted into the through-hole 11a of the adaptor 11 (FIG. 4C), the protrusions 21a are inserted into the engaging grooves 3d. The cap thus applied excludes an external force, and prevents the second ferrule 5 from slipping off from the housing.

Figure 6:
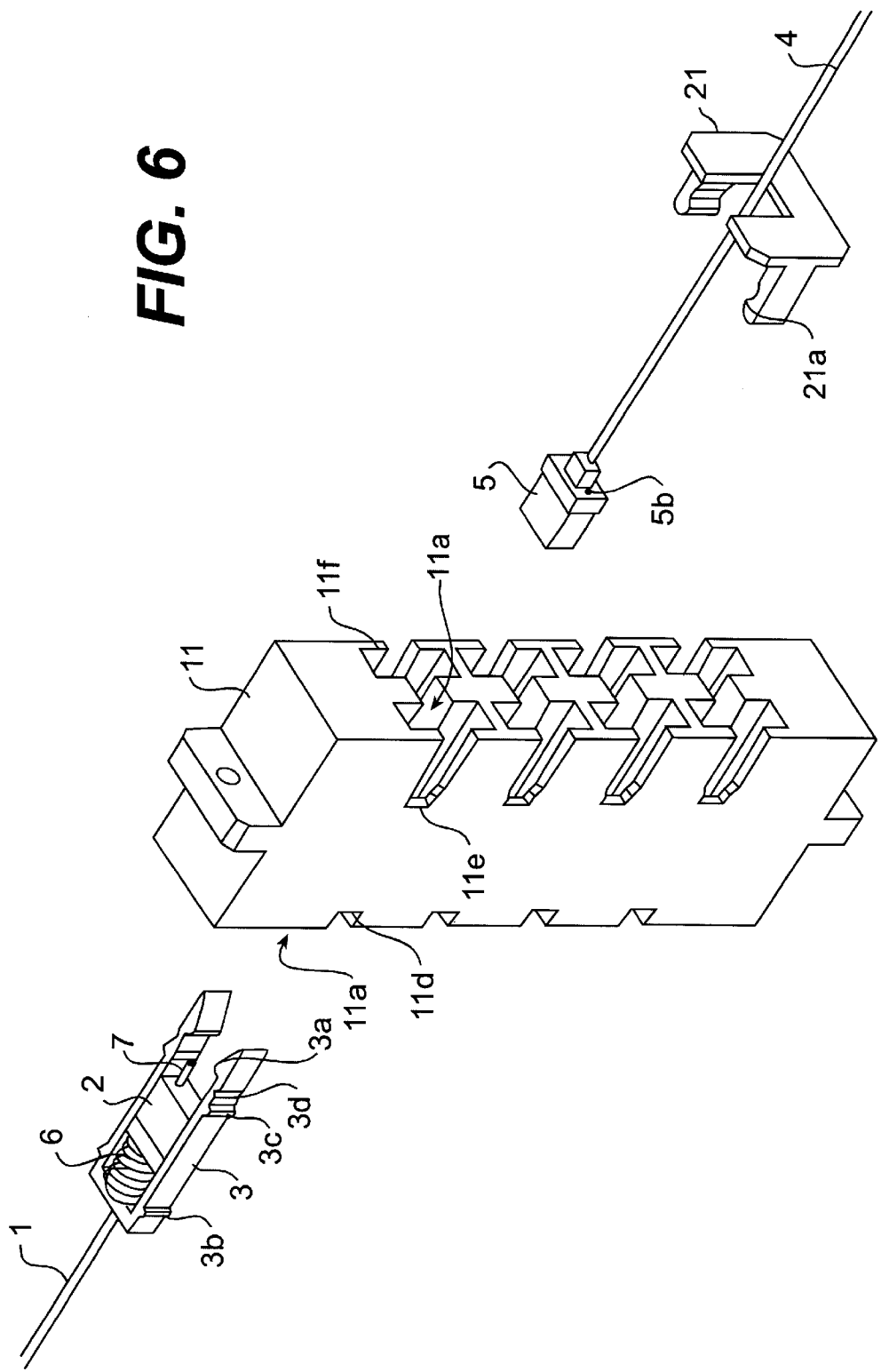
FIG. 6 is a perspective view useful in explaining the second embodiment of the optical connector constructed according to the present invention.

FIG. 6 is a perspective view useful in explaining the second embodiment of the optical connector constructed according to the present invention. In the figure, like reference numerals designate like or equivalent portions in FIGS. 1 to 5B. A left-hand optical connector includes the first ferrule 2, coiled spring 6 and housing 3. The first ferrule 2 holds the terminus of the first optical fiber 1. The connector is inserted into the through-hole 11a of the adaptor 11, from the left side of the through-hole. The engaging protrusions 3b and 3c of the housing 3 are inserted into the engaging grooves 11d and 11e, respectively. It is a rare case that the connector thus attached to the adaptor is detached from the adaptor and attached again to the adaptor. Therefore, the connector is left attached to the adaptor. The connectors are attached to all the through-holes 11a of the adaptor, although not shown.

The second ferrule 5, which holds the terminus of the second optical fiber 4, is inserted into the through-hole 11a of the adaptor 11 from the right end of the through-hole, by use of a gripping tool, which will be described later with reference to FIGS. 7 and 8. The second ferrule 5 is gripped with the gripping tool and brought to the tool positioning hole 11f of the adaptor 11. The guide pin 7 of the first ferrule 2 is inserted into the guide pin hole 5b of the second ferrule 5, to thereby couple them together. Both ends of the side of the second ferrule 5 from which the second optical fiber 4 is led out are abutted against the holder portion 3a.

Thereafter, the gripping tool is pulled out of the adaptor, and the protrusions 21a of the cap 21 are attached to the engaging grooves 3d of the housing 3. In a case where the optical connector assemblies are used as connectors in an optical branch module accommodating portion of a fiber termination module, there is no need for plugging the second ferrules 5 in all the through-holes 11a of the adaptor 11. In this case, it is only needed that with an increase of the number of subscribers, the necessary number of the second ferrules 5 are plugged in the through-holes to couple the optical fibers together by means of the optical connectors.

To decouple the ferrules 2 and 5 from each other, the cap 21 is removed, and the second ferrule is pulled out of the adaptor by use of the gripping tool. To be more specific, the gripping tool is inserted into the through-hole 11a from its right end while being guided by the tool positioning hole 11f of the adaptor 11. The second ferrule 5 is gripped with the tool, the holder portion 3a is disengaged from the side of the second ferrule 5 from which the second optical fiber 4, the housing 3 is decoupled from the second ferrule 5, and the second ferrule 5 is decoupled from the first ferrule 2, and finally the tool is pulled out of the through-hole of the adaptor.

FIGS. 7A and 7B are first explanatory diagrams for explaining an example of a gripping tool used for the optical connector constructed according to the present invention. FIGS. 7A and 7B are a plan view and a front view showing the gripping tool. FIG. 8 is a second diagram for explaining the gripping tool used for the optical connector. In those figures, reference numeral 31 is a central support; 31a is a distal end of the central support; 31b is a bearing; 31c is a guide groove; 32 is a pair of gripping members; 32a is a pair of pawls; 33 are compressed coiled springs; 34 and 37 are stoppers; 35 is a slide portion; 35a is wedge portions of the slide portion; 36 is a lever; 36a is a slide hole; 38 is an expanded coiled spring; and 39 is a handle. The outside surface of the slide portion 35 is shaded in the figures.

The gripping tool includes the gripping members 32, the slide portion 35, the central support 31 and the like. Each of the gripping members 32 have a couple of the pawls 32a formed at the distal end thereof. The pawls 32a are used for gripping the second ferrule 5 (FIG. 6 and other related figures). The slide portion 35 includes the wedge portions 35a at its distal end. The wedge portions 35a disengages the second ferrule 5 from the holder portion 3a of the housing 3 to remove the coupling force between the housing 3 and the second ferrule 5. The central support 31 supports the gripping members 32 and the slide portion 35. Many conventional optical connectors, e.g., MPO (multipass push on) connector, each have an attach/detach function. Since the gripping tool is provided with this attach/detach function, the number of necessary component parts of the connector can be reduced, and this leads to the high density mounting.

With provision of the gripping member 32, a variation of the insertion position of the second ferrule 5 is reduced to a minimum. The side surfaces of the distal ends and its near portions of the gripping members 32 are shaped so as to sever positioning portions at the time of the inserting of the second ferrule 5 into the optical connector subassembly. The positioning portions of the gripping members 32 are inserted into the adaptor 11 while being guided by the tool positioning hole 11f of the adaptor 11. The second ferrule 5 is highly precisely inserted into the adaptor 11. Since the side surfaces of the distal ends and its near portions of the gripping members 32 serve as a positioning portion, there is no need of additionally manufacturing an independent positioning part. This leads to simplification of the connector parts structure.

The side surfaces of the distal ends and its near portions of the gripping members 32 are beveled so as to allow the gripping tool to smoothly be inserted into the adaptor 11.

The central support 31 is a member shaped like a square column as a whole. A collar portion, which extends in every radial direction, is formed at the central portion of the central support 31 (FIG. 7A). The bearing 31b is located to the right (in the drawing) with respect to the collar portion. The couple of gripping members 32 are supported by and turnable about the bearing 31b. The gripping members 32 are urged by compressed coiled springs 33 attached to the right side of the bearing, and have the stoppers 34. By compressing the couple of gripping members 32 at about portion of coiled springs 33 with fingers, the pawls 32a of the gripping members 32 are opened. Each of the gripping members 32 has the couple of pawls 32a as already stated (FIG. 7B, so that a total of four pawls are used for gripping the second ferrule 5 (FIG. 6 and other related figures).

As shown in FIG. 7B, the slide portion 35 is slidably fit to the central support 31 while being located to the left in the drawing. The slide portion 35 includes the wedge portions 35a at its distal end, and is connected to the lever 36 by means of a screw. The lever 36 has the slide hole 36a and is urged by the expanded coiled spring 38 toward the handle. The lever 36 is slidable to the left on the central support 31 till the screw of the stopper 37 comes in contact with the right end of the slide hole 36a. To slidably move the lever 36, a protruded part of the lever 36, which is formed on the right end part of the lever, is pressed down. The central support 31 is connected to the handle 39 by means of a buried bolt. Thus, the gripping tool can be operated by one hand.

Figure 8:
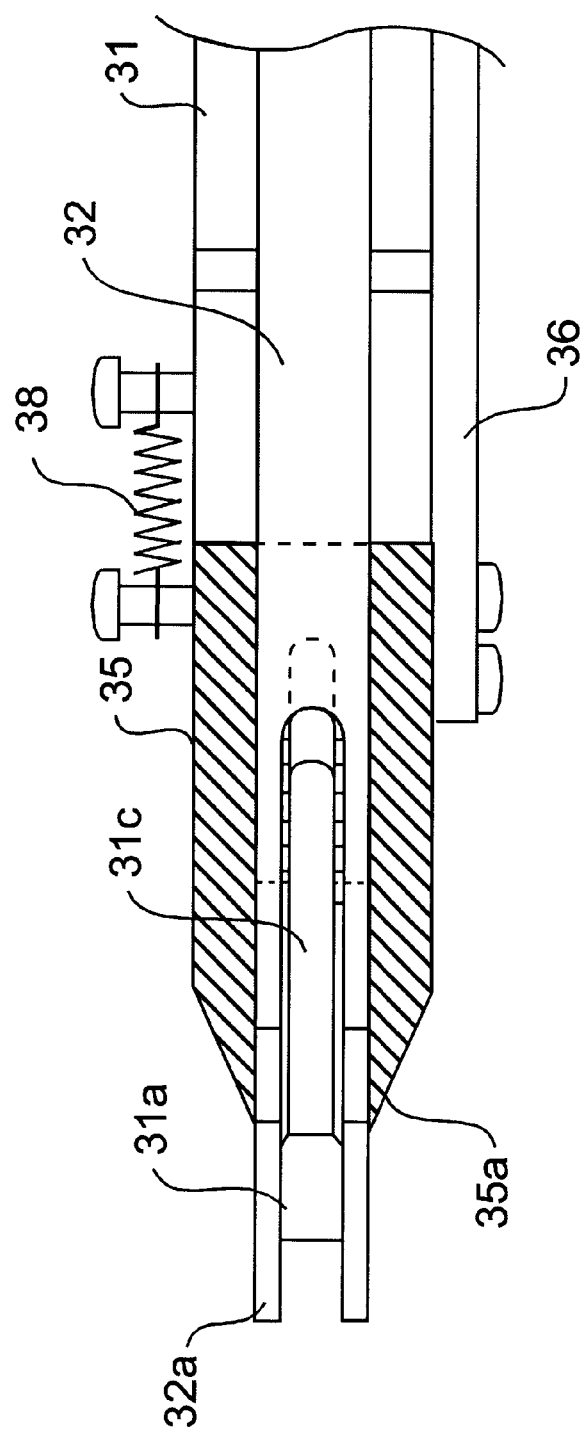
FIG. 8 is a second diagram for explaining the gripping tool used for the optical connector.

FIG. 8 is a rear view showing the gripping tool with respect to the front view of FIG. 7B. As shown, the guide groove 31c extending from the distal end 31a of the central support 31 in the right-hand direction is provided in the gripping tool. The guide groove 31c is indicated by a broken line in FIG. 7A. The guide groove 31c receives the protruded portion of the root of the second ferrule 5 (FIG. 6 and other related figures) from which the optical fiber is derived, and guides the second optical fiber 4 while preventing the fiber core from being bent by a smaller curvature radius than a predetermined one. For this reason, the right end corners of the guide groove 31c are curved.

FIGS. 9A to 9E are explanatory diagrams for explaining a process of coupling the connectors by use of the gripping tool. FIGS. 9A to 9E are sectional views showing a sequence of steps in the connector coupling process. In those figures, like reference numerals designate like or equivalent portions in FIGS. 1 to 4, and 7. The ferrules 2 and 5 are attached in the drawing. As shown, a housing including a first ferrule 2 and a coiled spring 6 is already inserted in the upper portion of each of the through-hole 11a of the adaptor 11.

Figures 9A, 9B, 9C:
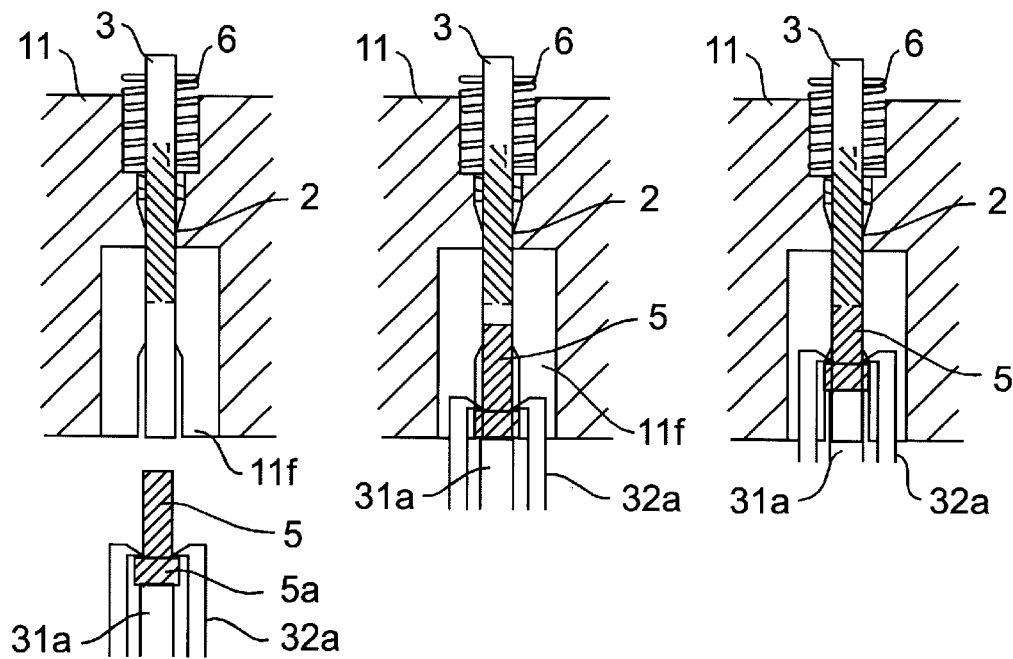
FIGS. 9A to 9E are explanatory diagrams for explaining a process of coupling the ferrules in the optical connector by use of the gripping tool.
Figures 9D, 9E:
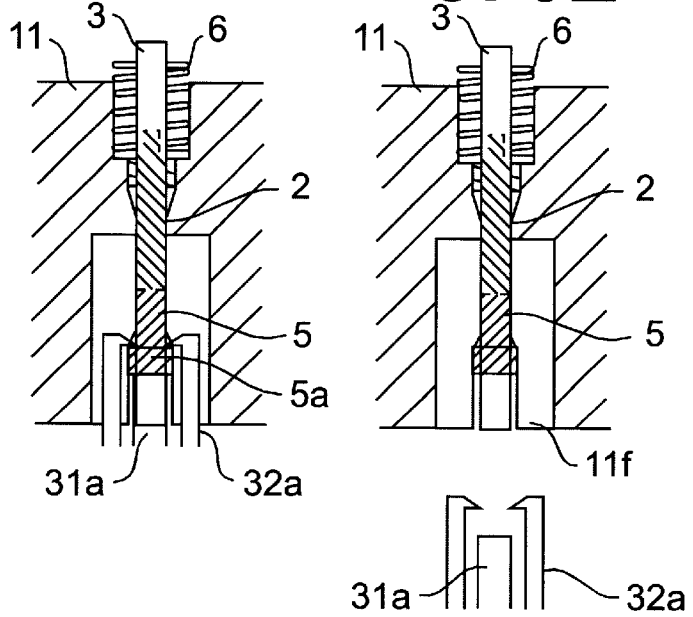
Figure 10A:
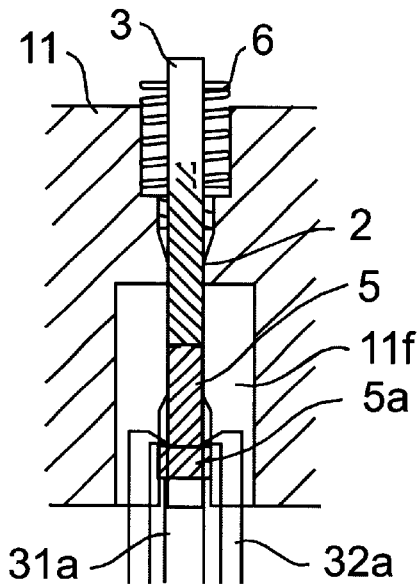
FIGS. 10A to 10B are first explanatory diagrams for explaining a process of decoupling the ferrules in the optical connector by use of the gripping tool.
Figure 10B:
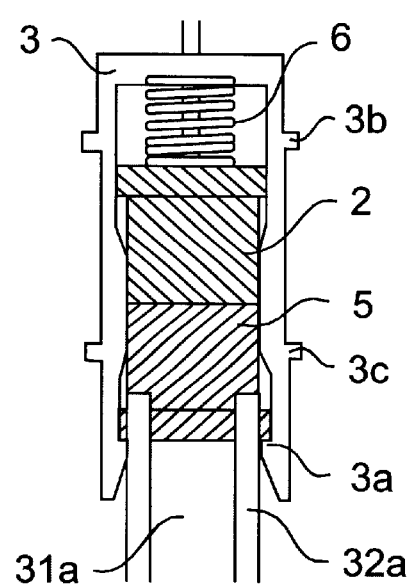

To set the second ferrule 5 to the adaptor 11, the collar portion 5a of the second ferrule 5 is gripped with the pawls 32a of the gripping members 32 and the distal end 31a of the central support 31, as shown in FIG. 9A. The distal end of the gripping members 32 is inserted into the adaptor 11 along the tool positioning hole 11f of the adaptor 11, and the second ferrule 5 is inserted into the opening of the housing 3, as shown in FIG. 9B. The ferrules 2 and 5 are coupled together by the utilization of the combination of the guide pin 7 and the guide pin hole, and the second ferrule 5 is fixed to the holder portion 3a of the housing 3 (FIG. 6 and other related drawings), as shown in FIG. 9C. The pawls 32a of the gripping members 32 are opened and the second ferrule 5 is detached from the distal end of the gripping members 32, as shown in FIG. 9D. The distal end of the gripping members 32 is pulled out of the adaptor 11, as shown in FIG. 9E.

Figure 11A:
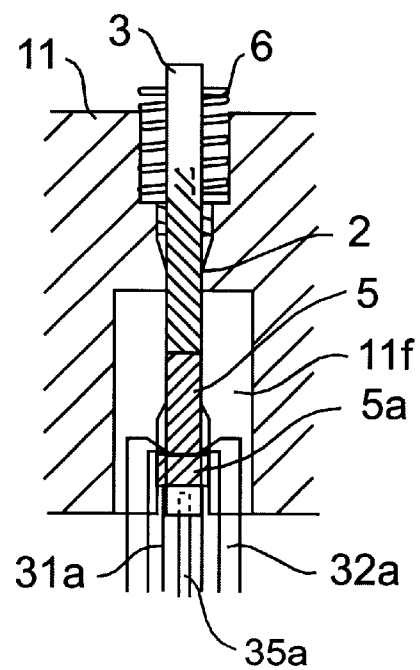
FIGS. 11A to 11B are second explanatory diagrams for explaining the ferrule decoupling process.
Figure 11B:
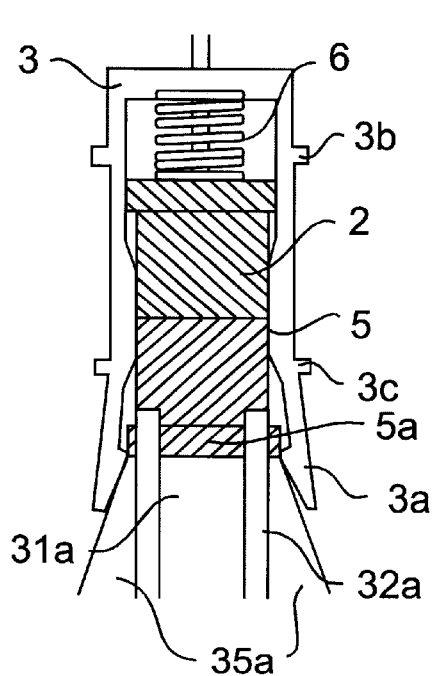
Figure 12A:
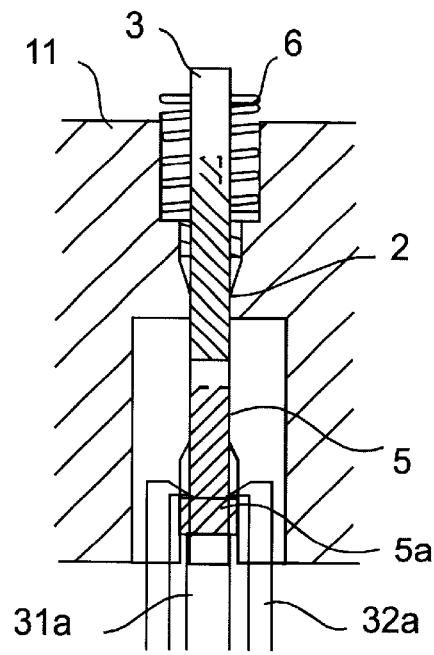
FIGS. 12A to 12B are third explanatory diagrams for explaining the ferrule decoupling process.
Figure 12B:
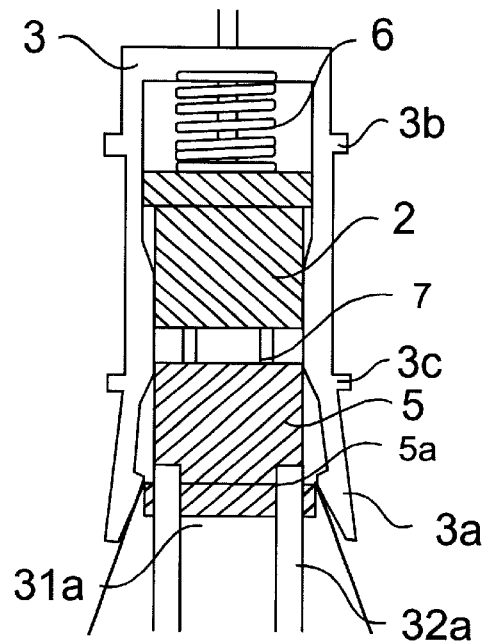

FIGS. 10A to 12B are explanatory diagrams for explaining a process of decoupling the optical connector by use of the gripping tool. FIGS. 10B, 11B and 12B are sectional views of the optical connector when viewed from side. In those figures, like reference numerals designate like or equivalent portions in FIGS. 1 to 4, and 7. The ferrules 2 and 5 are attached in the drawing.

As shown in FIG. 10, to decouple the optical connector by removing the second ferrule 5 from the adaptor 11, the distal end of the gripping tool is inserted into the tool positioning hole 11f of the adaptor 11. The pawls 32a of the gripping members 32 can be opened in advance. If not opened, the pawls 32a are automatically opened by bringing the distal end of the gripping members 32 into contact with the side of the second ferrule 5 from which the second optical fiber 4 is derived. The collar portion 5a of the second ferrule 5 is gripped with the pawls 32a of the gripping members 32 by closing them.

As shown in FIG. 11A, the wedge portions 35a of the slide portion are slid along the distal end 31a of the central support, as shown in FIG. 11. As shown in FIG. 11B, the wedge portions 35a of the slide portion are thrust into within the holder portion 3a of the housing 3 to forcibly open the opening of the housing 3. As a result, the holding by the holder portion 3a is removed and the second ferrule 5 is decoupled from the housing 3. As shown in FIG. 12, the distal ends of the gripping members 32 is pulled out to decouple the ferrules 2 and 5 one from the other, and pulled out of the through-hole 11a of the adaptor 11.

The gripping tool specially designed for the optical connector decoupling is used for decoupling the optical connector in the above-mentioned embodiment. A tool provided with only the gripping members 32 may be used for the same purpose. The lever 36, slide portion 35 and the wedge portions 35a are not included in the tool, as a matter of course. If a drive and control unit are additionally used, the optical connector decoupling may be automatically done. If required, the second ferrules 5 may be attached to and detached from the through-holes 11a of the adaptor 11 concurrently and independently. A generally used tool may be used in lieu of the specially designed tool mentioned above, for the optical connector decoupling.

The collar portion 5a somewhat protruded from the second ferrule 5 is gripped with the pawls 32a of the gripping members 32. Another raised part or recess may be used for the same purpose. In this case, there is no need of using the collar portion 5a. Further, if the gripping force is increased, the second ferrule 5 may be gripped without the raised part or recess.

In an optical connector according to the present invention is constituted by a first ferrule which holds the terminus of a first optical fiber; a housing having an opening formed in one of the widthwise sides of the housing; the housing receiving a second ferrule which holds the terminus of a second optical fiber through the opening; the housing surrounding one of the widthwise sides of the first ferrule from which the first optical fiber is derived and the lengthwise sides of the first ferrule, whereby the housing accommodates the first ferrule; and the housing surrounding the lengthwise sides of the second ferrule and a part of the side of the second ferrule from which the second optical fiber is derived, whereby the first and second ferrules are coupled together.

By merely moving the second ferrule in the coupling direction, the housing retains a coupling force, and the coupling of the optical fibers is completed. Therefore, the coupling work is simple and easy. Since the number of component parts is small, the mounting density of the connectors in a module is increased and the cost to manufacture is reduced.

According to the present invention, the housing gives rise to a coupling force of the first and second ferrules, and a holding force of holding the lengthwise sides of the first and second ferrules. Therefore, an external force is lessened, so that the coupling state of them is retained.

According to the present invention, the optical connector further includes a spring member located between one widthwise side of the housing and the widthwise side of the first ferrule from which the first optical fiber is derived, the spring member urging the first ferrule to the opening formed on the widthwise side of the housing. The first ferrule is urged by the spring member, thereby providing a stable coupling force.

According to the present invention, the housing includes first positioning portions for positioning the lengthwise sides of the first and second ferrules, a second positioning portion for positioning one end of the spring member, and a holder portion for detachably coupling together the first and second ferrules. In coupling the optical connectors, the end faces of them are highly precisely aligned with each other. The ring-like spring is set immovable in every radial direction, to thereby provide a fixed coupling force. The influence of an external force on the coupled connector is lessened.

According to the present invention, the housing consists of a U-shaped member, and the thickness of the housing is substantially equal to the thickness of the first and second ferrules. The result is a size reduction of the housing and an increase in the mounting density.

According to the present invention, the optical connector further includes a cap, the cap being applied to the opening of the housing after the first and second ferrules are coupled together, the housing having an engaging unit for engaging and fixing the cap. It is possible to exclude an external force, e.g., tension, which will exert on the coupled optical connectors.

According to the present invention, the optical connector can be attached to an adaptor having at least one through-hole, in a manner that the housing including the first ferrule is inserted into the through-hole of the adaptor from a first end of the through hole, the opening-formed on the side of the housing being first inserted, and the second ferrule is inserted into the through-hole of the adaptor from a second end of the through-hole. Therefore, it is easy to position the second ferrule in the optical connector coupling work. Further, the adaptor may be provided with a mounting unit by which the adaptor is mounted on a frame.

According to the present invention, the housing includes an engaging device, where the housing is fixed to the adaptor by the engaging unit. Therefore, the housing and the adaptor may be combined into a single unit.

According to the present invention, the adaptor includes a plural number of through-holes for receiving a plural number of the housings each including the first and second ferrules. A high density mounting of connector assemblies is secured.

According to the present invention, the adaptor has a hole for positioning a gripping tool for attaching and detaching the second ferrule when the tool is inserted into the through-hole. Therefore, the second ferrule may be inserted into the adaptor highly precisely to be coupled with the first ferrule within the housing.

A method of coupling an optical connector according to the present invention in which:
1) a second ferrule which holds the end of the second optical fiber is inserted, by use of a tool gripping the second ferrule, into the opening of the housing of an optical connector having a first ferrule which holds the ends of the first optical fibers,
2) the first and second ferrules are coupled together while the housing of the connector surrounding the lengthwise sides of the second ferrule and a part of the side of the second ferrule from which the second optical fibers are derived, and 3) the tool is removed.

When the ferrule coupling method is used, the coupling work is easily performed by use of the optical connector which requires a decreased number of component parts and hence contributes to the improvement of connector mounting density.

A method for decoupling the optical connector as coupled in a manner described in the preceding paragraphs includes the steps of:

1) inserting a tool capable of gripping said second ferrule into said optical connector through said opening side of said housing;
2) gripping said second ferrule with said tool;
3) opening the holder portions of the housing by inserting the wedge portions of said tool into the opening of said housing; and
4) pulling said tool out of said optical connector to decouple said first and second ferrules from each other.

According to the present invention, a method for decoupling the optical connector is easily performed, and the optical connector requires a decreased number of component parts and hence contributes to the improvement of connector mounting density.

According to the present invention, the gripping tool includes gripping members, and the side surfaces of the distal ends and its near portions of the gripping members serve as positioning portions at the time of the inserting of the second ferrule into the optical connector.

According to the present invention, the gripping tool includes gripping members, and the side surfaces of the distal ends and its near portions of the gripping members are bevelled. With provision of the gripping members, a variation of the insertion position of the second ferrule is reduced to a minimum. There is no need for additionally manufacturing an independent positioning part. This leads to simplification of the connector parts structure.

A gripping tool according to the present invention is used for the connector coupling and removing method of the present invention, such that the gripping tool includes gripping members and wedge portions for removing the fixing of the second ferrule at the opening-formed side of the housing. With provision of the gripping members, a variation of the insertion position of the second ferrule is reduced to a minimum. Further, the coupling force of the housing may be removed with a simple structure.

Figure 13:
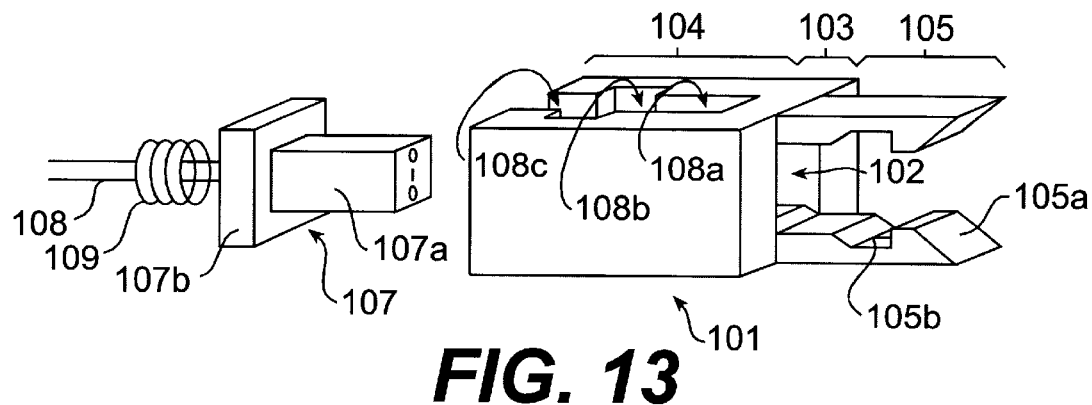
FIG. 13 is an exploded view showing an optical connector according to third embodiment of the present invention, in which a ferrule is decoupled from a housing.
Figure 14:
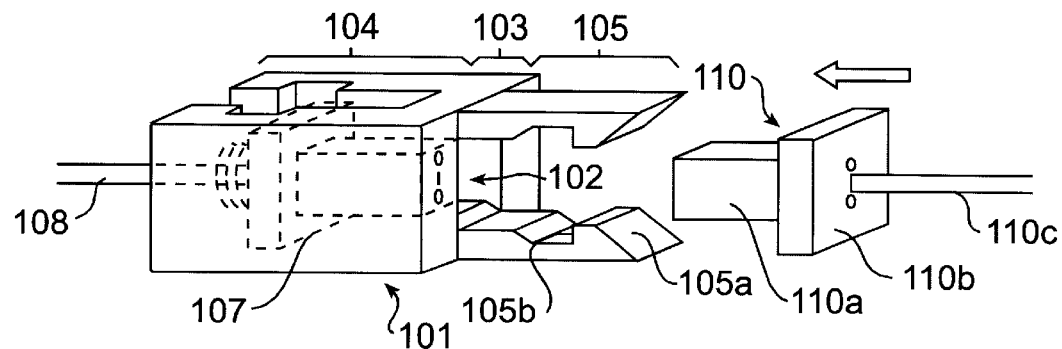
FIG. 14 is a perspective view showing the optical connector of the third embodiment before a ferrule is coupled with an optical connector.
Figure 15:
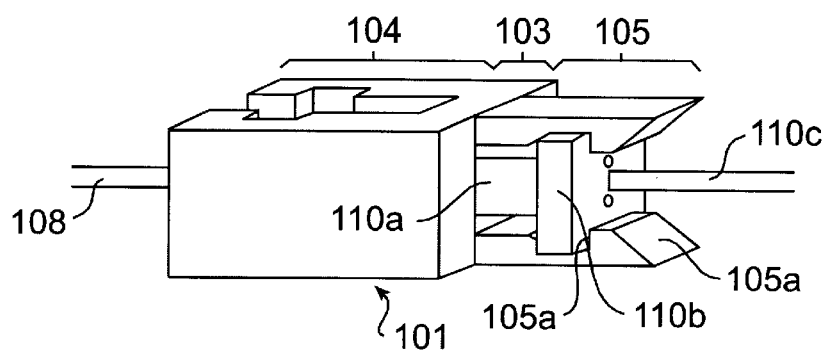
FIG. 15 is a perspective view showing the optical connector of the third embodiment after the ferrule is coupled with the optical connector.

FIGS. 13 through 15 are diagrams useful in explaining an optical connector, which is a third embodiment of the present invention. FIG. 13 is an exploded view showing an optical connector constructed according to the present invention, in which the ferrule is decoupled from a housing. FIG. 14 is a perspective view showing the optical connector before the ferrule is coupled with the optical connector. FIG. 15 is a perspective view showing the optical connector after the ferrule is coupled with the optical connector. In these figures, reference numeral 101 is a housing; 102 is an opening portion; 102 is an outer surface; 104 is a ferrule containing portion; 105 is a pair of gripping pawl portions; 105a is a slanted face; 105b is an engaging/fixing part; 106 is a ferrule insertion hole; 106a is a ferrule-body insertion hole; 106b is a collar insertion hole; 106c is a core insertion hole; 107 is a ferrule; 107a is a ferrule body; 107b is a collar; 108 is an optical fiber; 109 is a spring; 110 is a ferrule; 110a is a ferrule body; and 110b is a collar.

FIG. 13 is first referred to. In the housing 101, the outer surface 103 defining the opening portion 102 is located between the ferrule containing portion 104 and the gripping pawl portions 105. Those of plastic resin are molded into a one-piece construction. The end part of the ferrule 107 to be installed in the housing 101 is located in the opening portion 102, as will be described later, and the opening portion 102 receives the end of the ferrule to be coupled with the ferrule 107. The ferrule insertion hole 106 is formed in the upper surface of the ferrule containing portion 104. The ferrule insertion hole 106 may reach the bottom of the housing 101, viz., may be formed as a through-hole. The ferrule insertion hole 106 is parted into the ferrule-body insertion hole 106a, collar insertion hole 106b and core insertion hole 106c. The hole 6a receives the ferrule body 107a of the ferrule 107 at a location closer to the opening portion 102. The hole 106b receives the collar 107b of the ferrule 107. The hole 106c surrounds the lead-out part of the optical fiber 108 attached to the ferrule 107. Each of the upper and lower (when viewed in the drawing) gripping pawl portions 105 includes the slanted faces 105a formed at their tips and the engaging/fixing parts 105b formed in the mid portion thereof. The gripping pawl portions 105 may have a proper elasticity when the housing is made of flexible plastic resin and the gripping pawl portions 105 are shaped to have a proper size.

The ferrule 107 consists of the ferrule body 107a and the collar 107b, and is one-piece molded. In the present embodiment, the optical fiber 108 is the optical fiber, but may be any of other suitable optical fibers. The spring 109 is set around the optical fiber 108 on the rear side of the collar 107b of the ferrule 107.

The length of the collar insertion hole 106b of the housing 101 is larger than that of the collar 107b of the ferrule 107 when viewed in the lengthwise direction of the optical connector. To insert the ferrule 107 into the housing 107, the collar 107b of the ferrule 107 is positioned at the rear part in the collar insertion hole 106b while compressing the spring 109. The length of the ferrule-body insertion hole 106a when viewed in the lengthwise direction of the connector is selected so as to allow the ferrule body 7a of the ferrule 107 to be inserted into the ferrule-body insertion hole 106a of the ferrule insertion hole 106. At this position, the ferrule 107 is made to descend and the leading edge of the ferrule 107 reaches the position of the opening portion 102 of the ferrule containing portion 104. Then, the spring urges the ferrule 107, so that the ferrule 107 advances and its leading edge reaches the opening portion 102 position. The edges of the opening portions 102 are preferably tapered so as to secure a smooth insertion of the ferrule.

FIG. 14 is a perspective view showing the optical connector before a ferrule is coupled with an optical connector constructed with the housing 101 containing the ferrule 107. The ferrule 110 is manually inserted into the optical connector in the direction of an arrow. The collar 110b of the ferrule 110 advances along the slanted faces 105a of the gripping pawl portions 105 to bend the gripping pawl portions 105.

In the coupling state shown in FIG. 15, the collar 110b of the ferrule 110 engages and is fixed to the engaging/fixing parts 105b of the griping pawl portions 105. In the engaging and fixed state of the collar, the ferrule 110 is fixed in a state that it slightly pushed backward against the ferrule 107. As a result, an urging force of the spring 109 acts on the coupling surfaces of the ferrules to enhance the coupling of them. Also in this state, the guide pins of one of the ferrules 107 and 110 are inserted into the guide holes of the other.

In a modification of the embodiment a plural number of housings constructed according to the invention may be stacked, In this case, a high connector mounting density is realized.

Figure 16:
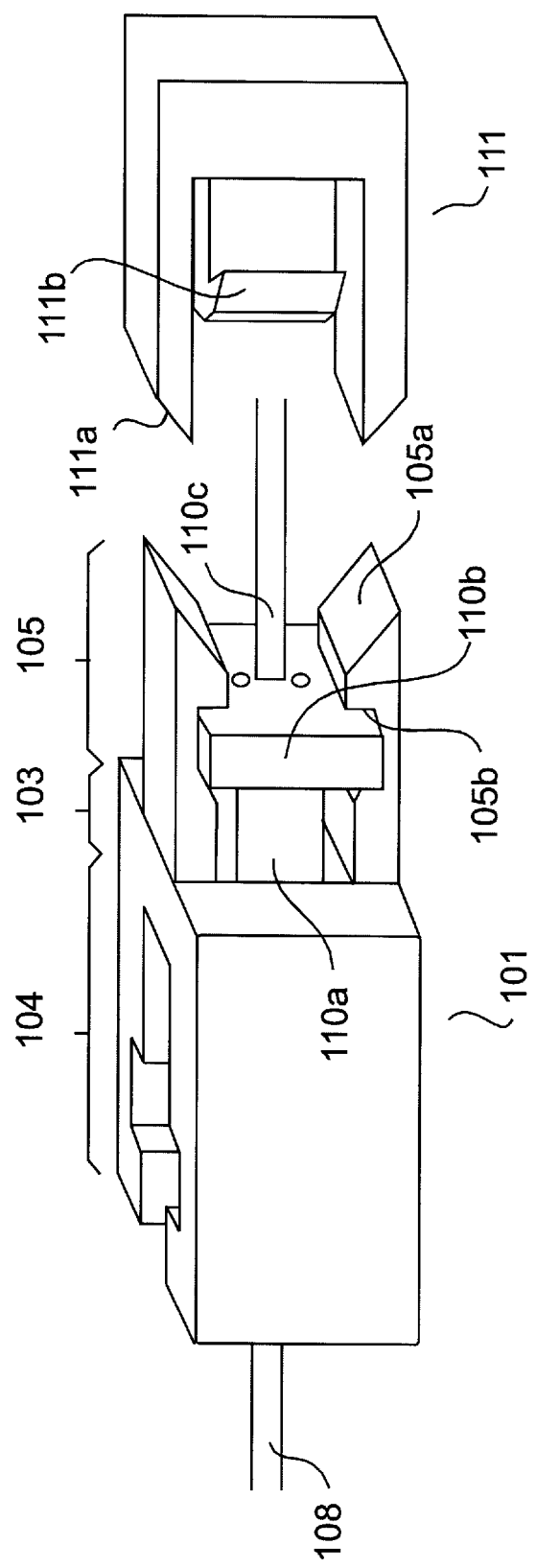
FIG. 16 is a perspective view showing how to remove the ferrule from the optical connector.

FIG. 16 is a perspective view showing how to remove the ferrule from the optical connector. In the figure, like reference numerals designate like or equivalent portions in FIGS. 13 to 15. In the figure, reference numeral 111 is a gripping tool; 111a is a wedge portion; and 111b is a pawl. The pawl 111b is preferably elastic. The gripping tool 111 of plastic resin is molded into a one-piece construction.

The wedge portions 111a of the gripping tool 111 are slanted, and the slanted faces 105a of the gripping pawl portions 105 is also slanted. The ends of the bifurcated gripping tool 111 are slanted to have the wedge portions 111a, and the ends of the gripping pawl portions 105 are also slanted to have the slanted faces 105a. Those ends may be properly shaped; for example, the ends may be shaped at right angles or curved. However, the space between the wedge portions 111a must be wide enough to open the slanted faces 105a of the gripping pawl portions 105.

To remove the ferrule 110, the gripping tool 111 is inserted to between the gripping pawl portions 105 of the optical connector in the direction of an arrow as shown in FIG. 16. At a position where the collar 110b slips off the gripping pawl portions 105, the pawl 111b of the gripping tool 111 engages the collar 110b of the ferrule 110. At this time, the gripping tool 111 is pulled out, so that the ferrule 110 is removed from the optical connector.

When the gripping tool 111 shown in FIG. 16 is applied to the optical connector shown in FIGS. 13 to 15, the removal of the ferrule is easy. The tool is simple and has a light weight, so that the removal work is easy.

The gripping tool may be applied not only to the optical connector shown in FIGS. 13 to 15, but also to any coupling structure of the ferrule to be coupled to the optical connector, viz., the optical connector having the gripping pawl portions as shown in FIG. 13.

As seen from the foregoing description, according to the gripping tool is used only when the ferrule is removed. Therefore, the structure of the tool may be simple and the removal work is simple and easy. Since the tool is made of plastic resin, the tool is small in size and weight. If the tool is mistakenly dropped, there is less chance that the dropped tool damages persons and the optical fibers.

Further, the number of necessary component parts is small, whereby a high density array of connectors is secured.

Figure 17:
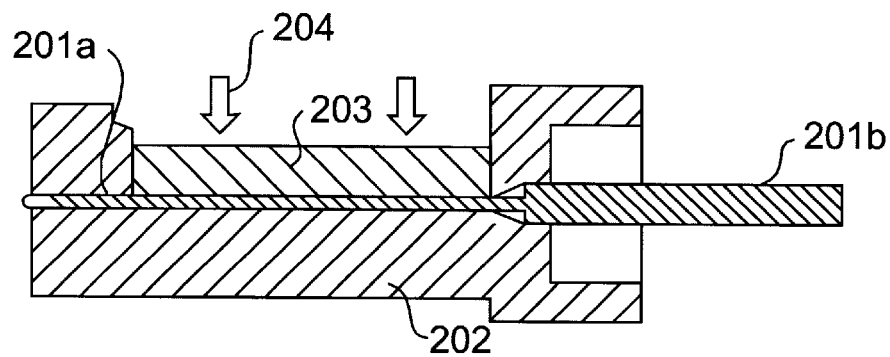
FIG. 17 is a sectional view useful in explaining the concept of an optical connector which is a fourth embodiment of the present invention.

FIG. 17 is a sectional view useful in explaining the concept of an optical connector which is a fourth embodiment of the present invention. In the figure, reference numeral 201a is an exposed glass fiber portion of an optical fiber; 201b is a coated fiber portion of the optical fiber; 202 is an optical connector body; 203 is a holding member; and 204 is a pressing force. In the present embodiment, a ferrule per se for fixing the optical fiber is used as an optical connector body. If required, a ferrule may be provided as an independent component within an optical connector body.

The optical fiber is inserted into the optical connector body 202 from the back side of the connector body, and the exposed fiber portion 201a of the optical fiber is put in a positioning groove (not shown). The holding member 203 is put on the exposed fiber portion of the optical fiber, and presses down the exposed portion there by a pressing force 204. The pressing force 204 is produced by a spring member (not shown). The tip of the exposed fiber portion 1a of the optical fiber is fixed to the connector body 202 in a state that it is appreciably protruded from the coupling surface of the optical connector body. If so done, a good contact is ensured in the optical coupling by a PC (physical contact). In a case where the protrusion of the tip of the exposed fiber portion is large, the tip of the exposed fiber portion is sometimes bent in the coupling of the optical connector. To avoid the bending of the exposed fiber tip, 0.2 mm or shorter is a preferable protrusion of the fiber tip.

In the optical connector, adhesive is not used for fixing the optical fiber to the optical connector body. Therefore, the fixing work of the optical fiber is easy. Further, the holding member is used for applying the pressing force to the optical fiber that is put in the positioning groove of the optical connector body. Therefore, there is no chance that the optical fiber placed in the positioning groove is scraped.

FIGS. 18 to 21 show a specific example of the fourth embodiment of the present invention. In those figures, like numerals are used for designating like or equivalent portions in FIG. 17. In the figures, reference numeral 202a is an optical fiber insertion hole; 202b is a guide pin hole; 202c is a collar portion; 202d is a fiber fixing portion; and 205 is a clipping member.

Figure 18:
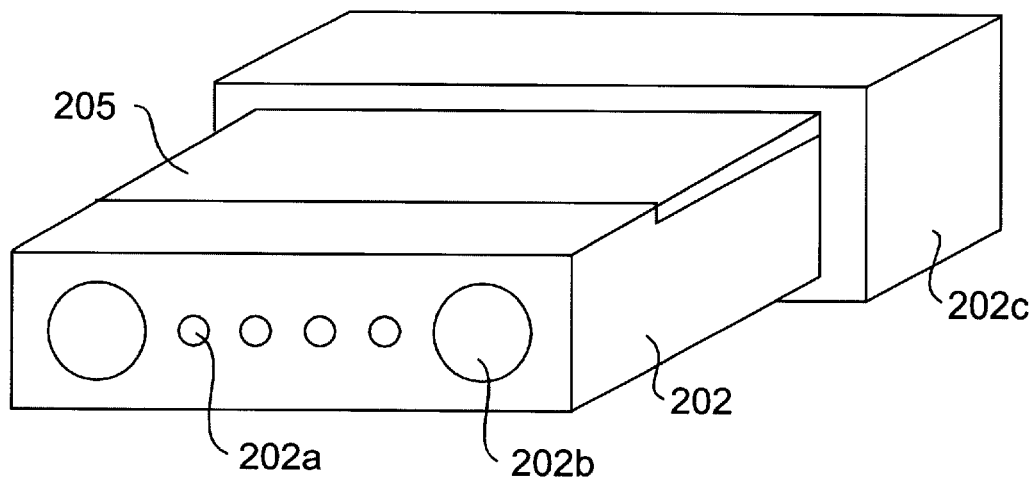
FIG. 18 is a perspective view showing a completed optical connector constructed according to the fourth embodiment.
Figure 20:
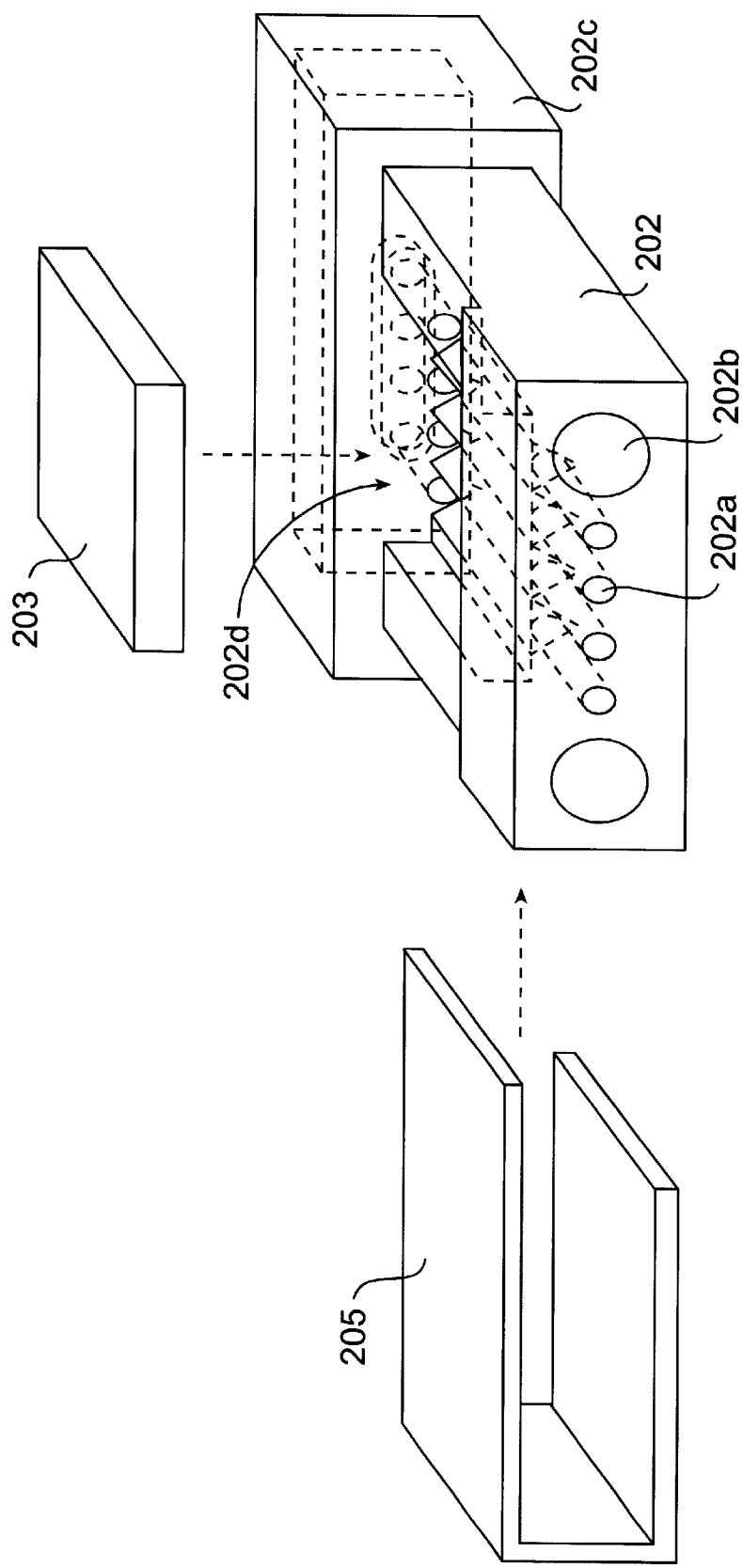
FIG. 20 is an exploded view showing the optical connector.

FIG. 18 is a perspective view showing a completed assembly of the optical connector. FIG. 20 is an exploded view showing the optical connector. The optical fiber insertion holes 202a and the guide pin holes 202b are formed in the coupling surface of the optical connector body 202. The fiber fixing portion 202d is provided on front of the collar portion 202c. Positioning grooves, triangular in cross section, for receiving optical fibers are formed in the bottom of the fiber fixing portion 202d. The holding member 203 is inserted into the fiber fixing portion 202d and pressed down onto the exposed fibers from above. The clipping member 205 is constructed with an elastic member, e.g., a plate spring, and presses the holding member 203 by its elastic force.

Figure 21:
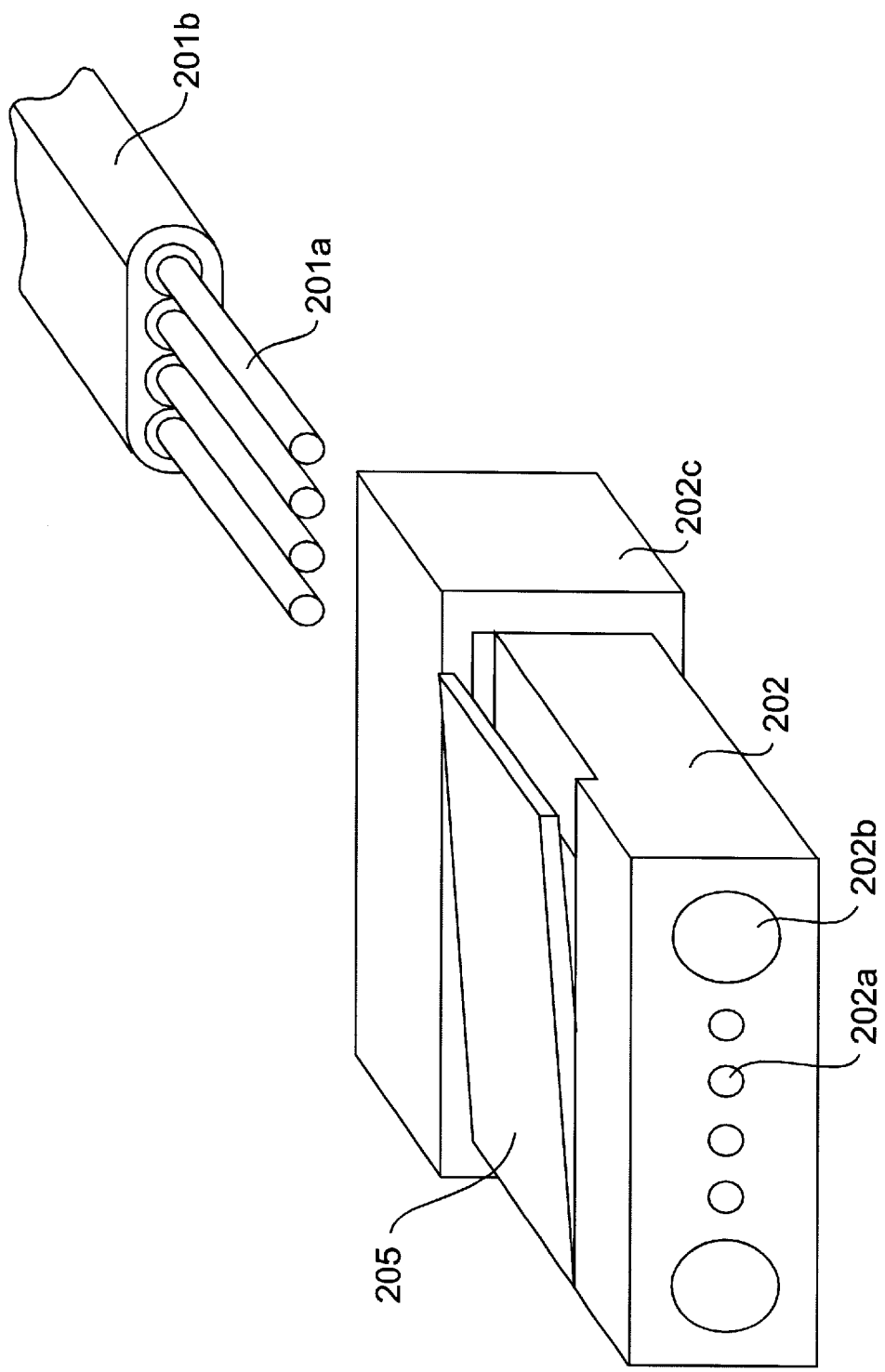
FIG. 21 is a perspective view showing the optical connector before an optical fiber is inserted into the connector.

FIG. 21 is a perspective view showing the optical connector before an optical fiber is inserted into the connector. To insert the fiber core with exposed fibers into the connector, the clipping member is bent somewhat upward by means of a suitable tool (not shown), to alleviate the pressing force of the holding member 203. In this state, the flat fiber core is inserted into the optical connector body 202 from the connector back side, and the tool is removed to fix the coated fiber portion and the exposed fiber portion as well as in the optical connector body. An optical method of inserting the flat fiber core into the optical connector may be used, as a matter of course. In this fiber inserting method, the flat fiber core is inserted into the connector body 202 being in a disassembled state, viz., in a state that the clipping member 205 and the holding member 203 are removed from the connector body. After the insertion, the holding member 203 and the clipping member 205 are applied to the connector body to fix the exposed fibers and the coated fiber portion of the flat fiber core.

Figure 19:
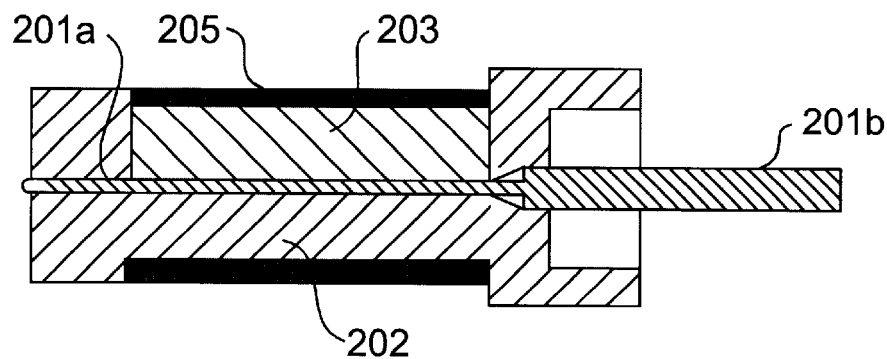
FIG. 19 is a sectional view showing the optical connector according the fourth embodiment.

FIG. 19 is a sectional view showing the optical connector in which an optical fiber is fixed. As shown, the exposed fiber portion 1a of the optical fiber is held by the holding member 203, while the holding member 203 is compressed with the clipping member 205. Thus, the optical fiber is fixed by the compressing force of the clipping member. Therefore, the fiber fixing work is reduced as compared to the optical connector using the adhesive for fiber fixing since there is no need of hardening the adhesive.

FIGS. 22A to 22D are sectional views showing another optical connector according to the fourth embodiment of the present invention. In the figure, like reference numerals designate like or equivalent portions in FIGS. 17 to 20. Reference numeral 202e is a set of fiber positioning grooves; 202f is an engaging groove; and 206 is a plate spring. The engaging groove 202f is formed in the inner wall of the fiber fixing portion 202d of the optical connector body 202. In the instant example, the plate spring 206 is put in the engaging groove 202f for its fixing.

Figure 22A:
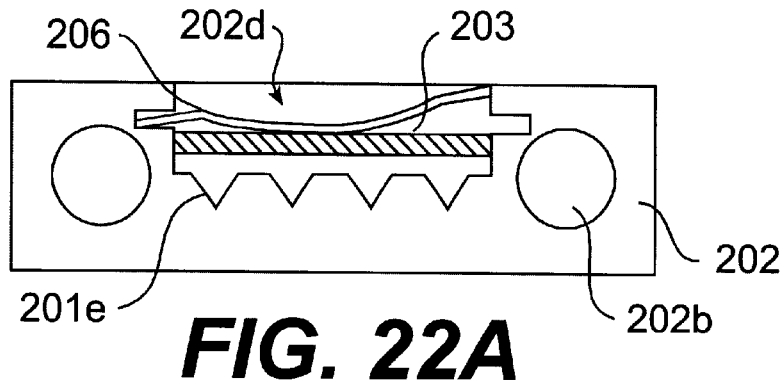
FIGS. 22A to 22D are sectional views showing another optical connector according to the fourth embodiment of the present invention.
Figure 22B:
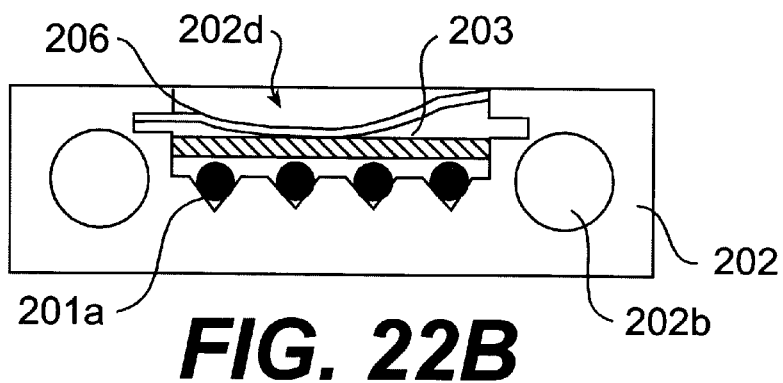

FIG. 22A shows a state of the optical connector before a flat fiber core is inserted into the optical connector. In this state, no pressing force of the plate spring 206 exerts on the holding member 203. Also in this state, a optical fiber containing four optical fibers is inserted into the optical connector body 202 as in the case described referring to FIGS. 22A to 22D, and four exposed fibers 1a of the fiber core are positioned in the fiber positioning grooves 202e, as shown in FIG. 22B. In this instance, four optical fibers are used but a single optical fiber may be used instead, as a matter of course.

Figure 22C:
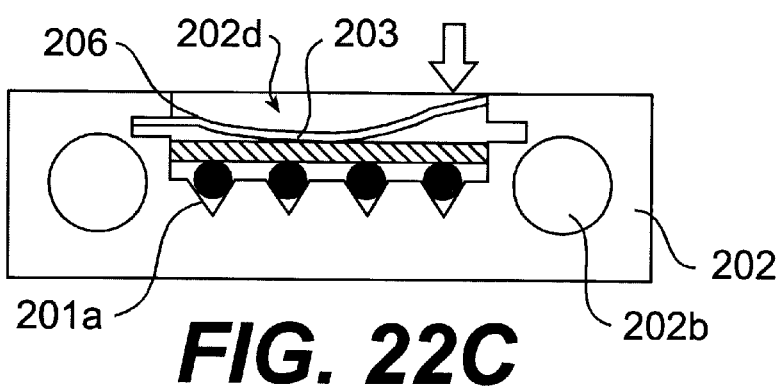
Figure 22D:
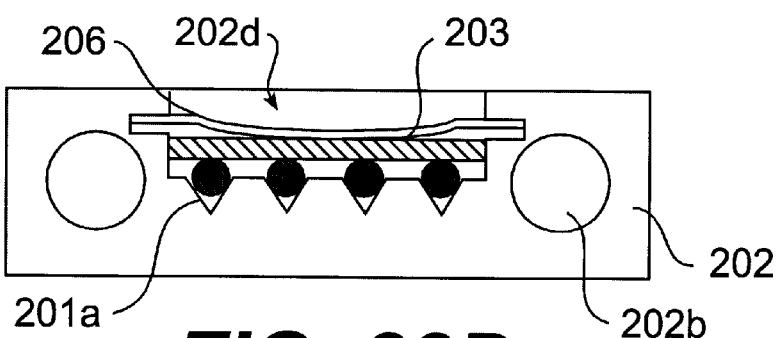

The end of the plate spring 206, which is not yet inserted into the engaging groove 202f, is inserted into the groove as shown in FIG. 22C, so that both ends of the plate spring 206 are put in the engaging groove 202f as shown in FIG. 22D. In this state, the exposed fibers 201a of the optical fiber are fixed to the optical connector body 202 by the pressing force of the holding member 203, caused by the plate spring 206.

Figure 23:
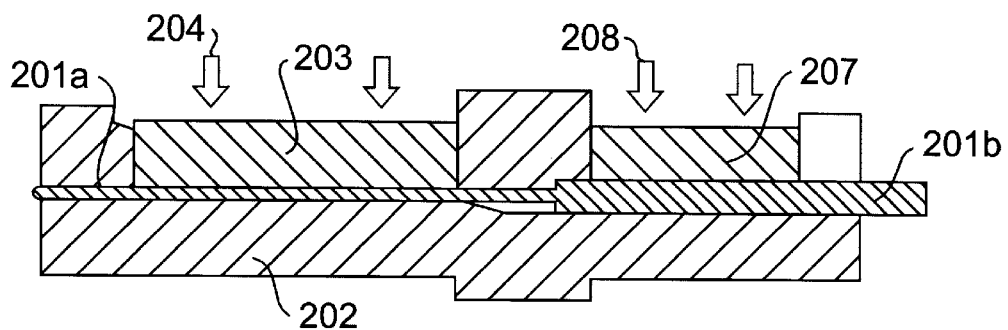
FIG. 23 is a sectional view showing a concept of an optical connector which is a fifth embodiment of the present invention.

FIG. 23 is a sectional view showing a concept of an optical connector which is a fifth embodiment of the present invention. In the figure, like reference numerals designate like or equivalent portions in FIG. 17. In the figure, numeral 207 designates a holding member, and 208 represents a pressing force.

In the present embodiment, a part of the coated fiber portion 1b of the optical fiber is also fixed to the optical connector body 202. The exposed fiber portion 1a of the optical fiber is inserted into the optical connector body 202 from the connector back side, and positioned in the positioning groove, and held by the holding member 203 pressed by a pressing force 204. The coated fiber portion 201b of the optical fiber is also held by the holding member 207 pressed by a pressing force 208. The pressing forces 204 and 208 are produced by a spring member. The tip of the exposed fiber 201a of the optical fiber, fixed to the optical connector body 202, is appreciably protruded from the coupling surface as described in connection with FIG. 17, whereby a good physical contact is secured at the time of optical coupling.

Also in this optical connector, adhesive is not used in fixing the optical fiber. Therefore, the fixing of the optical fiber is easy. It is noted that the pressing force is applied to the exposed fiber portion through the holding member. With this feature, there is no chance that the optical fiber put in the positioning groove is damaged. Further, the coated fiber portion of the optical fiber is also fixed in the present embodiment. Therefore, the gripping force by which the optical fiber is gripped is increased, and hence a tensile strength of the optical fiber fixed by the optical connector is improved.

A specific example of an optical connector which constitutes the fifth embodiment of the present invention is shown in FIGS. 24 to 27. In those figures, like reference numerals designate like or equivalent portions in FIGS. 17 to 21, and reference numeral 202g is a coated-fiber-portio fixing portion, and 209 is a clipping member.

Figure 24:
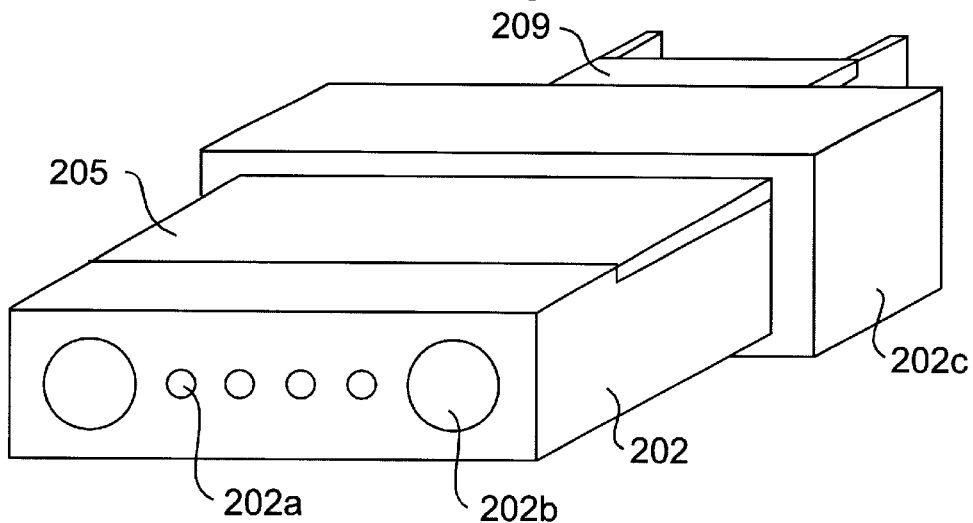
FIG. 24 is a perspective view showing the optical connector constructed according to the fifth embodiment of the invention.
Figure 26:
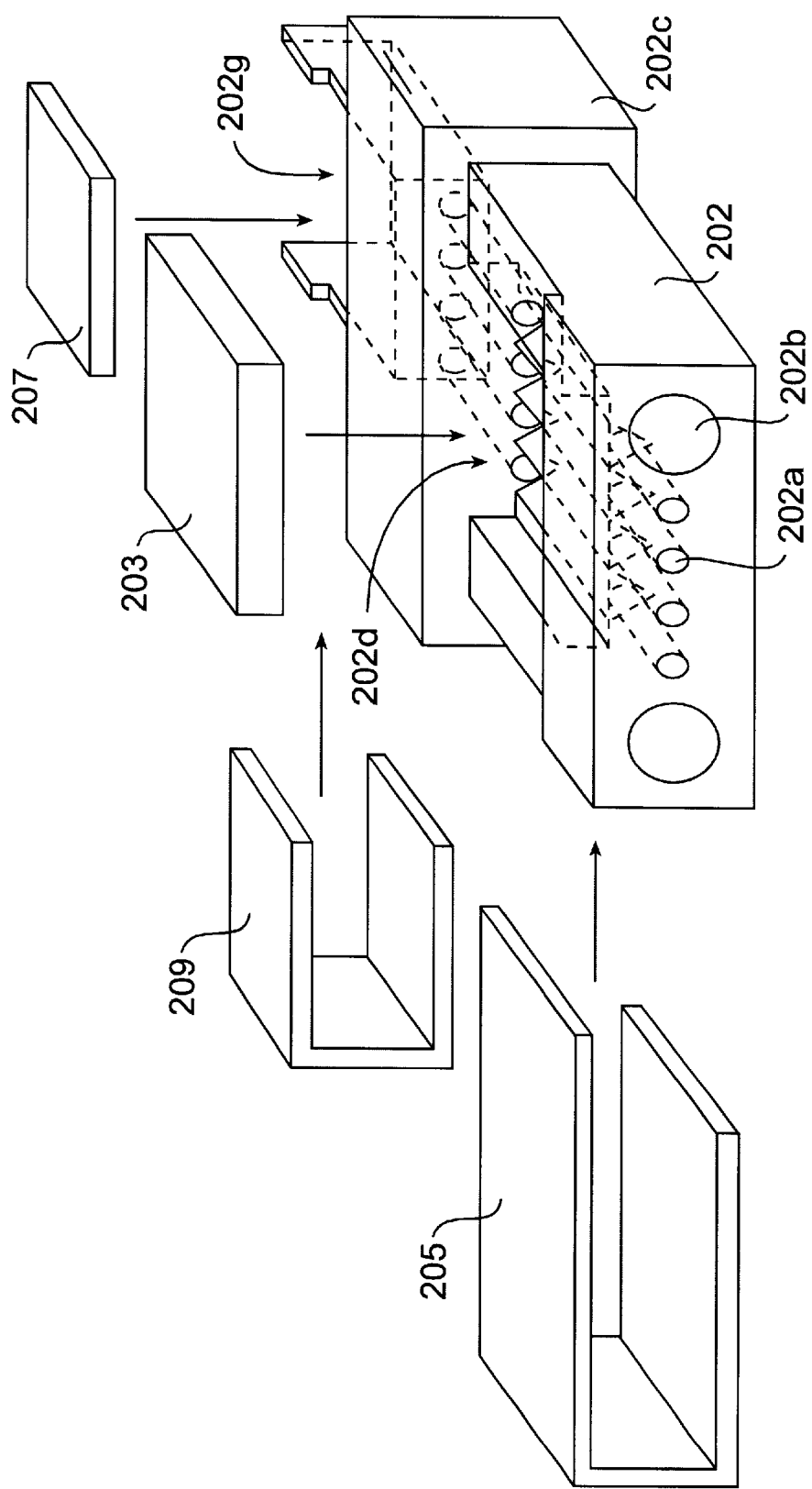
FIG. 26 is an exploded view showing the connector constructed according to the fifth embodiment of the invention.

FIG. 24 is a perspective view showing the optical connector constructed according to the fifth embodiment of the present invention. FIG. 26 is an exploded view showing the connector constructed according to the fifth embodiment of the invention. As shown, optical fiber insertion holes 202a and guide pin holes 202b are formed in the coupling surface of the optical connector body 202. In the connector, a fiber fixing portion 202d and a coated-fiber-portion fixing portion 202g are located on both sides of the collar portion 202c. A set of positioning grooves each of V-shape in cross section, are formed in the bottom of the fiber fixing portion 202d. The optical fibers are to be put in those grooves. The shape of each groove is not limited to the V-shape, but may take any other suitable shape, e.g., a semicircle. In the specific example under discussion, the optical fiber is put in the coated-fiber-portion fixing portion 202g while remaining tape covered. Therefore, the bottom of the coated-fiber-portion fixing portion 202g is shaped flat. When optical fibers coated for their protection from which the tape is removed and a single coated optical fiber are held in the coated-fiber-portion fixing portion 202g, the bottom of the coated-fiber-portion fixing portion may be tailored in shape so as to receive the fibers or fiber, as a matter of course. The holding members 203 and 207 are put on the uncoated-fiber fixing portion 202d and the coated-fiber fixing portion 202g respectively. The clipping members 205 and 209 are formed with elastic members, e.g., plate springs, and their elastic forces are transformed, by the holding members 203 and 207, into pressing forces by which the optical fiber is pressed and fixedly held in the fixing portions.

Figure 27:
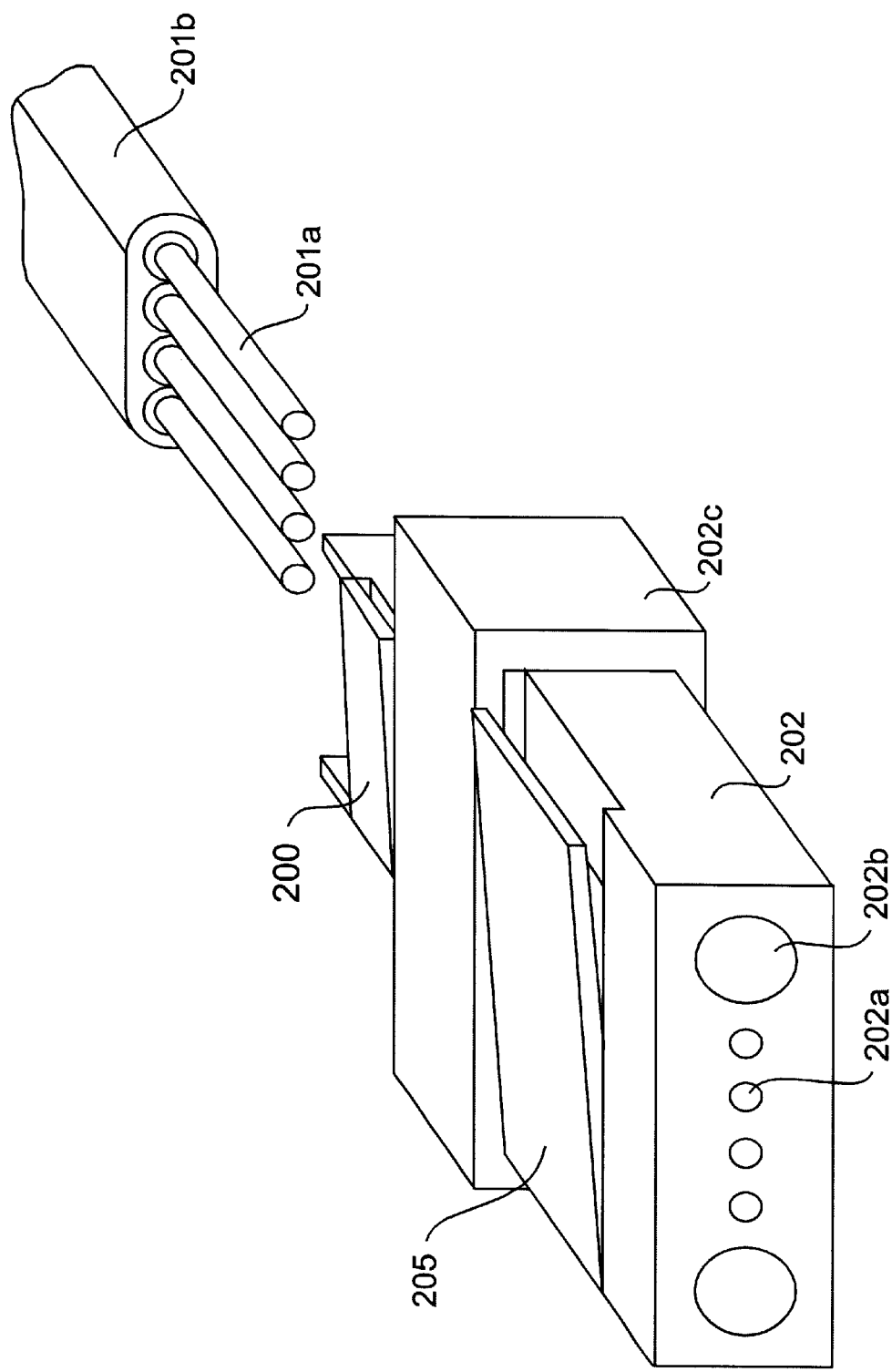
FIG. 27 is a diagram showing the optical connector just before an optical fiber is inserted into the connector of the fifth embodiment of the invention.

FIG. 27 is a diagram showing the optical connector just before an optical fiber is inserted into the connector of the fifth embodiment of the invention. To insert the fiber core with the exposed fibers into the connector, the clipping member is bent somewhat upward by means of a suitable tool (not shown), to alleviate the pressing force of the holding member 203. In this state, the flat fiber core is inserted into the optical connector body 202 from the connector back side, and the tool is removed to fix the flat fiber core and the exposed fibers as well in the optical connector body. To secure an easy positioning of the exposed fibers of the fiber core when the fiber core is inserted into the connector, guide grooves for the exposed fibers are preferably formed in the bottom of the coated-fiber-portion fixing portion 202g. An optional method of inserting the flat fiber core into the optical connector may be used, as a matter of course. In this fiber inserting method, the flat fiber core is inserted into the connector body 202 being in a disassembled state, viz., in a state that the clipping members 205 and 209 and the holding members 203 and 207 are removed from the connector body. After the insertion, the holding members 203 and 207 and the clipping members 205 and 209 are applied to the connector body to fix the exposed fiber portion and the coated core portion of the optical fiber.

Figure 25:
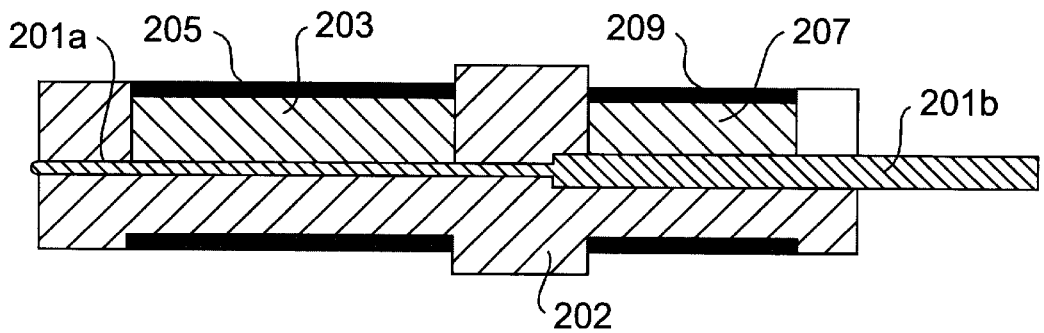
FIG. 25 is a sectional view showing the optical connector of the fifth embodiment of the invention.

FIG. 25 is a sectional view showing the optical connector in which an optical fiber is fixed. As shown, the exposed fiber portion 201a of the optical fiber is held by the holding member 203, while the holding member 203 is compressed with the clipping member 205. The coated fiber portion 201b of the optical fiber is held by the holding member 207, and the holding member 207 is compressed with the clipping member 209. Therefore, the fiber fixing time is reduced as compared to the optical connector using the adhesive for fiber fixing since there is no need of hardening the adhesive.

Another example of the optical connector which is the fifth embodiment of the present invention is shown in FIGS. 28A to 30B. In these figures, like reference numerals are used for designating like or equivalent portions in FIGS. 23 to 27. In the figures, reference numerals 203a and 207a are wedge insertion holes; 203b is a protruded portion of the holding member 203; 210 is a base member; 210a is a protruded portion of the base member 210; 210b and 210c are V-shaped grooves of the base member 210; 211 is a clipping member; and 212 is a wedge member. The base member 210 may be formed as an independent member, separately from the connector body 202, attached to the collar portion 202c, or formed integrally with the connector body 202.

Figure 28A:
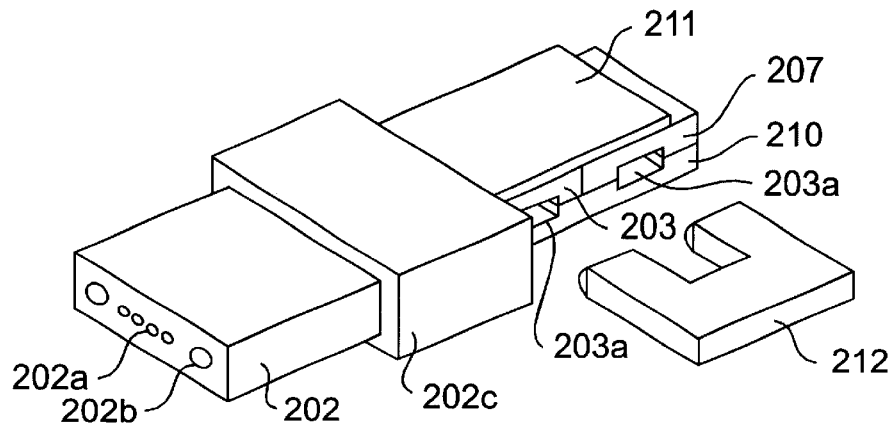
FIGS. 28A to 28E are perspective views showing another optical connector constructed according to the fifth embodiment of the present invention.

FIG. 28A is a perspective view showing an optical connector before an optical fiber is inserted into the connector.

A fixing section for fixing an exposed fiber portion and a coated fiber portion of the optical fiber is provided on the rear side of the collar portion 202c of the connector body 202. The guide pin holes 202b provided in front of the fixing section are used for positioning the exposed fibers of the optical fiber inserted into the connector. The fixing section is formed with the base member 210, holding member 3 and clipping member 211. The holding member 203 fixedly holds the exposed fibers of the optical fiber by pressing them against the base member 210. The clipping member 209 fixedly holds the coated fiber portion of the fiber core by pressing it against the base member 210. In this embodiment, one clipping member 211 is used for both the holding members 203 and 207. Separate slipping members may be used for those holding members, respectively. The holding members 203 and 207 may be formed with a single member. In the embodiment, wedge insertion holes 203a and 207a are formed between the holding members 203 and 207 and the base member 210. The wedge member 212 is inserted into those holes.

V-shaped grooves are formed in the upper surface of the base member 210 being in contact with the lower surface of the holding member 203. In FIGS. 28A to 28E, those grooves are not seen because the base member 210 and the holding members 203 and 207 are coupled together. The holding member 203 presses down the exposed fibers in those grooves. The clipping member 211 holds down the base member 210 and the holding member 203 in a state that the holding member 203 and the base member 210 with the positioning grooves are couples together.

A procedure for fixing the optical fiber to the optical connector will be briefly described. The wedge parts of the wedge member 212 are forcibly inserted into the wedge insertion holes 203a and 207a, which are located along the boundary line between the base member 210 and the holding members 203 and 207 in the structure where those members are coupled together. As a result of the wedge part insertion, the base member 210 and the holding members 203 and 207 are opened along the boundary line to form a gap therebetween. The exposed fibers of an optical fiber are inserted into the optical connector from the connector back side until the tips of the exposed fibers are appreciably protruded out of the optical fiber insertion holes 202a of the connector body 202. The protruded tips of the exposed fibers are adjusted by pressing the inserted optical fiber so as to have predetermined length values. Then, the wedge member 212 is pulled out of the gap between the base member and the holding members. The base member 210 and the holding members 203 and 207 are coupled together again by a force of the clipping member 211 to return from its expanded state to its original state, to thereby hold down the exposed fibers and the coated portion of the optical fiber. If required, a heat-shrinkable tube is applied to the optical fiber in advance, and after the fiber core is fixed, the tube is applied to the fixing section and thermally shrunk to protect the connection part. In the embodiment under discussion, the two wedge insertion holes 203a and 207a are provided in the base member and the holding members. Alternatively, those holes may be formed in either of the base member or the holding members.

Figure 29:
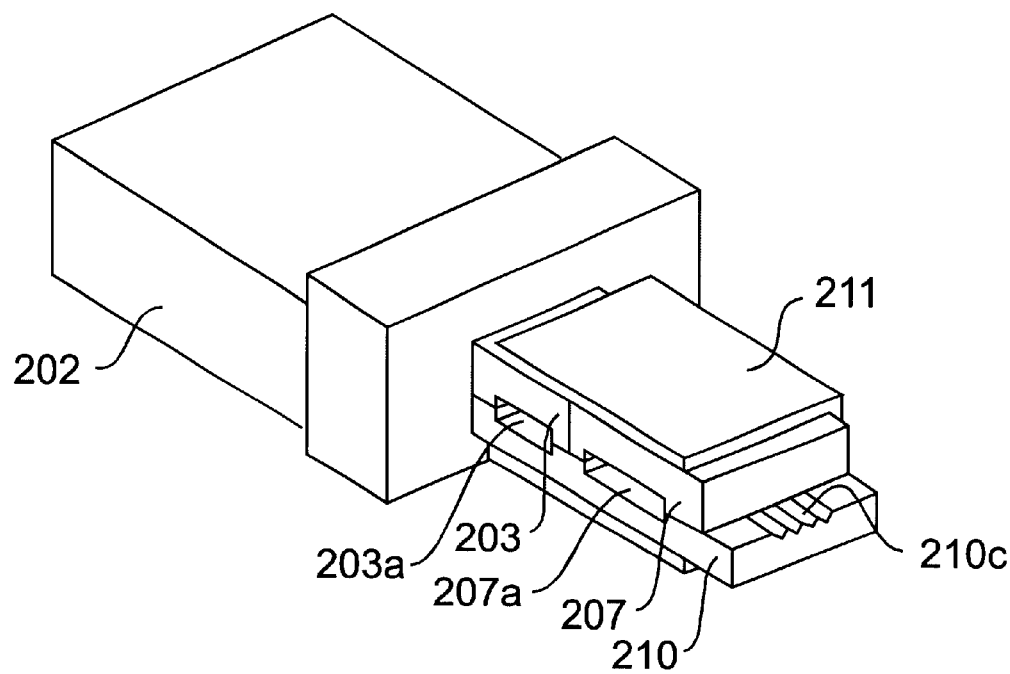
FIG. 29 is a perspective view showing a modification of a fixing section in the optical connector of the fifth embodiment.

V-shape grooves 210c may be provided extending outward from the rear side of the base member 210 as shown in FIG. 29. The V-shape grooves 210c are used for guiding the exposed fibers into the optical connector when the optical fiber is fixed to the connector.

Figure 30A:
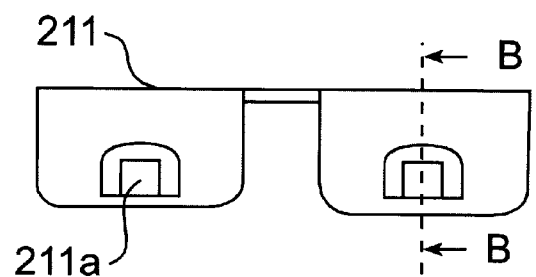
FIGS. 30A and 30B are explanatory diagrams useful in explaining a clipping member used in the fifth optical connector of the fifth embodiment.
Figure 30B:
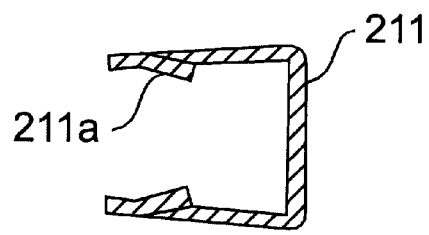

The clipping member 211 is used commonly for both the holding members 203 and 207 in the above-mentioned embodiment. The clipping member 211 may be modified to have two separate compressing portions as shown in FIG. 30A. These separate compressing portions press the holding members, respectively. In this case, the clipping member 211 may be provided with a stopper 11a to prevent the slipping off of the clipping member 211. With provision of the stopper 211a, there is no fear that the component parts come apart in handling the optical connector. If the stopper 211a is not used, no problem arises in usual situations. The stopper may be formed on the base member and the holder. In this case, holes to receive the stopper are formed in the clipping member 211.

Figure 28B:
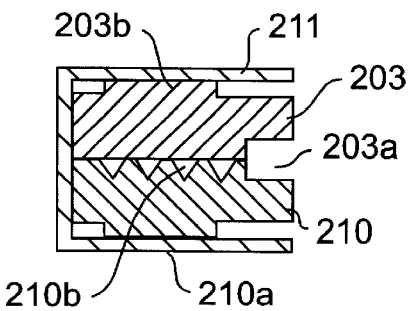
Figure 28C:
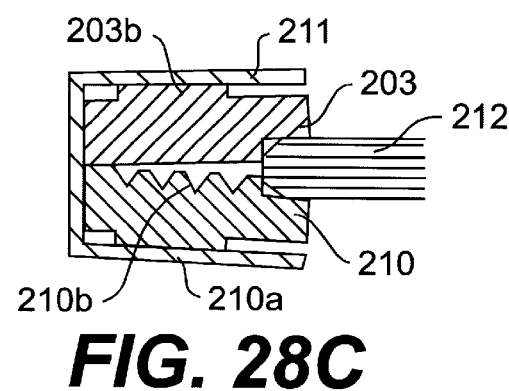
Figure 28D:
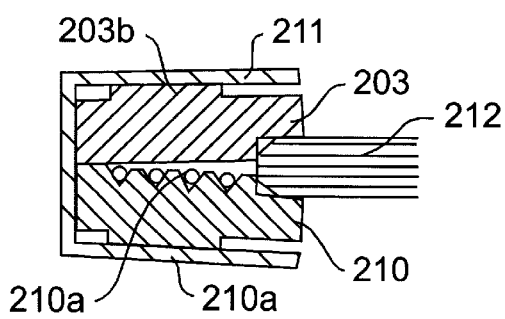
Figure 28E:
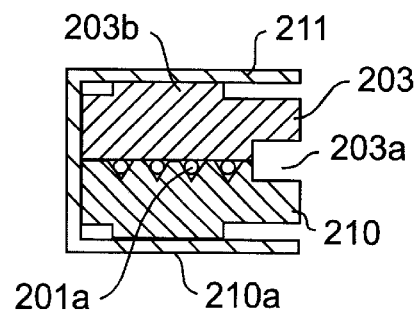

A sequence of steps of a procedure for fixing the optical fiber to the optical connector is shown in sectional form in FIGS. 29B to 28E. In the figures, the fixing operation by the holding member 203 is typically illustrated, but the same thing is correspondingly applied to the fixing operation by the holding member 207.

As shown in FIGS. 28B to 28E, a protruded portion 203b is formed on the holding member 203 while being extended in the lengthwise direction. Similarly, a protruded portion 210a is formed on the holding member 207 while being extended in the lengthwise direction. The legs of the clipping member 211 are brought into contact with those protruded portions 203b and 210a of the holding members 203 and 210, whereby the clipping member presses the holding members at the protruded portions. In this case, the clipping forces of the clipping member 211 are concentrated at the protruded portions. Therefore, the clipping forces directly exert on the exposed fibers and the coated fiber portion of the optical fiber. In a case where the optical fiber is flat, the flipping force uniformly exerts on the flat fiber core.

The V-shape grooves 210b are formed on the surface of the base member 210 which is to be in contact with the holding member 207. The portion of the base member 210 where it is to be brought into contact with the holding member 207 is preferably shaped corresponding to the shape of the coated fiber portion. Therefore, in a case where the optical connector is designed so as to receive the optical fiber for its fixing, the surface of the base member 210 is preferably flat. However, where the guide grooves as described in connection with FIG. 29 are used, the V-shape grooves 210b are formed therein.

FIG. 28B is a cross sectional view of the fixing section before the optical fiber is inserted into the optical connector. As shown, the V-shape grooves 10b are formed in the surface of the base member 210 which is in contact with the lower surface of the holding member 203. The V-shape grooves 210b receives the exposed glass fibers and positions them therein. The clipping member 211 elastically compresses the coupling structure of the base member 210 and the holding member 203, through the protruded portion 203b of the holding member 203.

FIG. 28C is a cross sectional vies showing the fixing section when the wedge part of the wedge member 212 is inserted into between the base member 210 and the holding member 203 to open them at a predetermined angle, with the fulcrum of the left side. In design, the height of the wedge insertion hole 203a and the thickness of the wedge part of the wedge member 212 are preferably selected so that the width of the gap produced between the base member 210 and the holding member 203 when those are opened is smaller than the outside diameter of the exposed fiber of the optical fiber. In this state, the optical fiber is inserted into the optical connector.

FIG. 28D is a cross sectional view showing the fixing section with the optical fiber has been inserted into the optical connector. If the fixing section is designed as mentioned above, when the optical fiber is gradually inserted into the optical connector, it never happens that the exposed fibers of the optical fiber are slipped off from the V-shape grooves. If the exposed fiber or fibers undulate, those fibers are left placed within the grooves 210b. In a case where the optical fiber to be inserted consists of four fiber cores, the four fiber cores are positioned within the V-shape grooves 210b. In this case, each fiber core is laid in the groove 210b such that the ridge of the fiber core is somewhat higher than the V-shape groove 210b. If the base member 10 and/or the holding member 203 is made of plastically or elastically deformable material, e.g., aluminum or plastic, a contact area of each exposed fiber in the fixing unit is increased, so that the fixing force is increased.

FIG. 28E is a cross sectional view showing the fixing section in which the exposed fibers are fixed. The wedge part of the wedge member 212 is pulled out of the wedge insertion hole 203a of the holding member 203, and the base member 210 and the holding member 203 are closed together again, and the exposed glass fibers 1a are fixed by the pressing force of the clipping member 211.

In this way, the exposed fibers and coated fiber portion of the optical fiber are fixed in the fixing section. The tips of the exposed fibers 1a are positioned by the optical fiber insertion holes in a state that the tips of the exposed fibers are appreciably protruded from the coupling surface of the connector body 202. Therefore, the fixed exposed fibers are little influenced by an external force applied thereto, and the fiber fixing work consumes a short time.

The holding member and/or the base member having the positioning grooves formed therein is made of deformable material. The upper part of each exposed fiber positioned in the related groove is compressed by the holding member and the base member in a state that the holding member and/or the base member is deformed inward. In a case where the material used belongs to any of some kinds of materials and/or the pressure force has any of some specific magnitudes, the holding member and/or the base member is deformed plastically as well as elastically. The material of the member or members may be aluminum or plastics. Aluminum is preferably pure aluminum of the order No. 1000 in JIS, and preferably the plastics material is LCP, epoxy resin or the like of which the Young's modules is equal to or smaller than the optical fiber so as not to scrape the optical fiber.

Figure 31A:
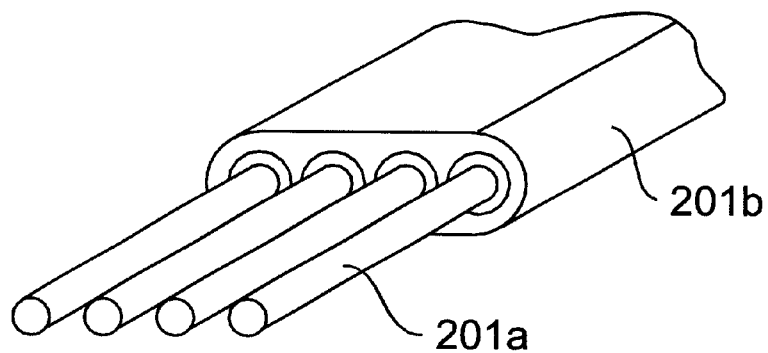
FIG. 31A is a plan view of the clipping member.
Figure 31B:
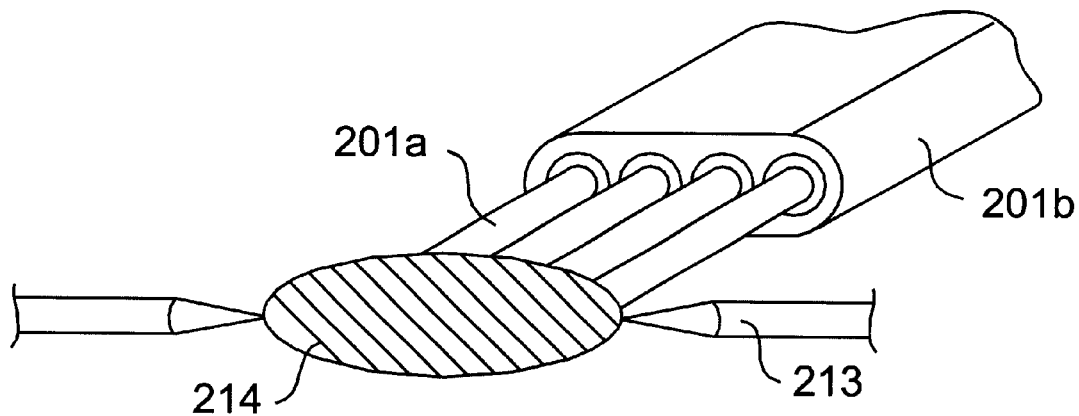
FIG. 31B is a cross sectional view taken on line B—B in FIG. 14A.
Figure 31C:
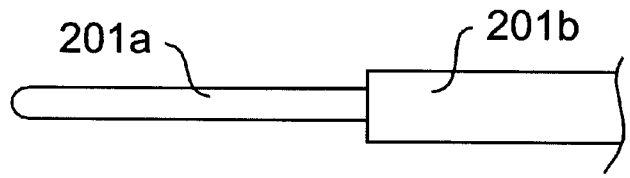
Figure 32A:
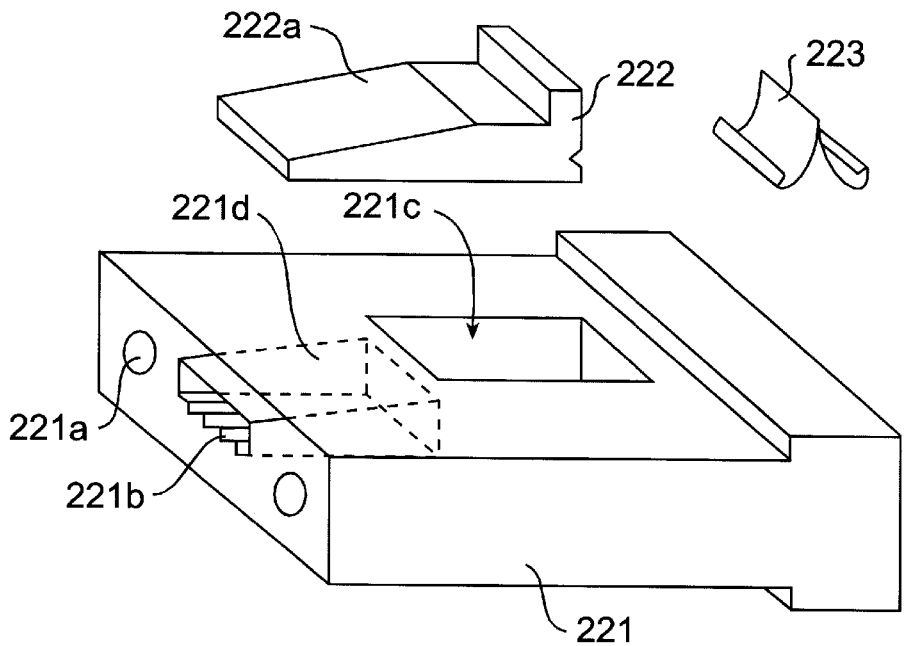
FIG. 32A is an exploded, perspective view showing the optical connector.
Figure 32B:
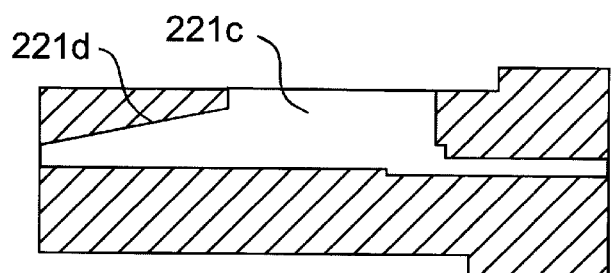
FIG. 32B is a sectional view of the optical connector.
Figure 32C:
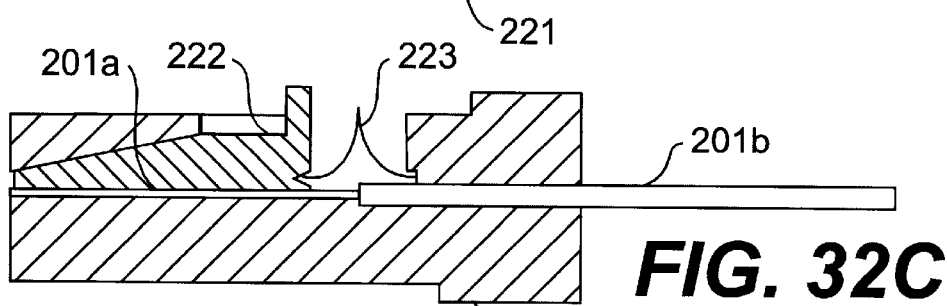
FIG. 32C is a sectional view showing the optical connector when an optical fiber is fixed in the optical connector.
Figure 32D:
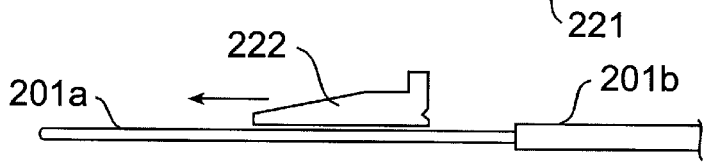
FIG. 32D is an explanatory diagram for explaining the work of fixing the optical fiber to the optical connector.

FIGS. 31A to 31C shows a set of diagrams useful in explaining how to process the ends of the exposed fibers. In the figure, like reference numerals designate like or equivalent portions in FIG. 17. Also in the figure, reference numeral 213 is a couple of discharging electrodes; and 214 is a discharging area. FIG. 31A is a perspective view showing the exposed fibers 1a of a optical fiber that are cut to have a predetermined length. It is a rare case that the end faces of the exposed fibers after being cut are perfectly flat. Usually, the end faces suffer from burrs.

In the present invention, a heating process to remove the burrs from the end faces of the exposed fibers after those are cut is carried out. In the heating process, as shown in FIG. 31B, the end faces of the exposed fibers are put between the discharging electrodes 213. An arc discharge is caused between the electrodes for a short time. The fiber end faces are placed in a discharging area 214 formed between the electrodes, and slightly molten. In the molten state, a surface tension of each fiber end face is curved, viz., an R working process is carried out. It is preferably to curve the fiber end face. Where the radius of curvature of the fiber end face is small, it leads to a poor optical coupling by a PC (physical contact). Further, the tip of the fiber core is concentrically stressed, leading to an increase of loss. For this reason, 0.1 mm or larger is a preferable radius of curvature of the end face of each of the exposed fibers 201a when the end face is worked by the arc discharging process.

The end face process mentioned above takes a reduced processing time, and improves the inserting work of the optical fiber into the optical connector. Further, it allows a PC connection of the optical fibers, so that the fiber connection of low reflection is achieved without using a matching liquid.

As seen from the foregoing description, in the optical connector according to the present invention, the optical fiber is positioned in the positioning groove formed in the ferrule and fixedly held by the holding member being urged by the spring member. Therefore, the optical fiber is set and fixed to the ferrule without scraping the fiber.

In the optical connector defined according to the present invention, the exposed fiber portion and coated fiber portion of the optical fiber are both held down by the holding member. The clipping force for clipping the exposed fiber portion is increased.

In the optical connector according to the present invention, the end face of said optical fiber is subjected to spark discharging process for a short time for its working. After the optical fiber is fixed, there is no need for the work of polishing the end face of the exposed fiber portion of the optical fiber. And the connection of the optical fiber without using grease is possible.

In the optical connector according to the present invention, the holding member is made of aluminum or plastics. The hardness of the material is smaller than that of the optical fiber. Therefore, there is no chance of scraping the fiber in the work of fixing the optical fiber.

What is claimed is:

1. An optical connector comprising:
    a ferrule and an optical fiber inserted into said ferrule and fixed therein,
    said optical fiber being positioned in a positioning groove formed in said ferrule and fixedly held therein solely by a force applied by a holding member being urged by a spring member, the spring member being releasable to enable the removal of the optical fiber.

2. An optical connector according to claim 1, wherein said optical fiber includes an exposed fiber portion and a coated fiber portion, and said exposed fiber portion and said coated fiber portion are both held down by said holding member.

3. An optical connector according to claim 1, wherein the end face of said optical fiber is subjected to electric discharging process for a short time for its working.

4. An optical connector according to claim 1, wherein said holding member is made of aluminum.

5. An optical connector according to claim 1, wherein said holding member is made of plastic.

6. An optical connector comprising:
    a ferrule and an optical fiber inserted into said ferrule and fixed therein, the optical fiber having a coated portion and an uncoated portion,
    said optical fiber being positioned in a positioning groove formed in said ferrule and fixedly held therein by a pair of holding members, each of the pair of holding members being separately urged by a corresponding, separately engageable spring member, one of the pair of holding members engaging the coated portion of the optical fiber and the other of the pair of holding members engaging the uncoated portion of the optical fiber.

* * * * *